US008254740B2

(12) United States Patent  
Smith et al.

(10) Patent No.: US 8,254,740 B2
(45) Date of Patent: Aug. 28, 2012

(54) METHODS AND SYSTEMS FOR DISTRIBUTING FIBER OPTIC TELECOMMUNICATIONS SERVICES TO LOCAL AREA

(75) Inventors: Trevor D. Smith, Eden Prairie, MN (US); Raymond Hagen, Apple Valley, MN (US); Thomas G. LeBlanc, Westminster, MA (US); Thomas Marcouiller, Shakopee, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 470 days.

(21) Appl. No.: 12/487,318

(22) Filed: Jun. 18, 2009

(65) Prior Publication Data

US 2009/0317047 A1 Dec. 24, 2009

Related U.S. Application Data

(60) Provisional application No. 61/074,009, filed on Jun. 19, 2008, provisional application No. 61/098,494, filed on Sep. 19, 2008.

(51) Int. Cl.
*G02B 6/46* (2006.01)
(52) U.S. Cl. ...................................................... 385/135
(58) Field of Classification Search .................... 385/135
See application file for complete search history.

(56) References Cited

U.S. PATENT DOCUMENTS

| 5,638,481 A | 6/1997 | Arnett |
| 5,659,650 A * | 8/1997 | Arnett ........................... 385/135 |
| 7,333,708 B2 | 2/2008 | Blackwell, Jr. et al. |
| 7,346,253 B2 | 3/2008 | Bloodworth et al. |
| 7,397,997 B2 | 7/2008 | Ferris et al. |
| 7,400,814 B1 | 7/2008 | Hendrickson et al. |
| 7,512,304 B2 | 3/2009 | Gronvall et al. |
| 7,522,806 B2 | 4/2009 | Hendrickson et al. |
| 7,546,018 B2 | 6/2009 | Hendrickson et al. |
| 7,715,679 B2 | 5/2010 | Kowalczyk et al. |
| 7,720,343 B2 | 5/2010 | Barth et al. |
| 7,748,660 B2 | 7/2010 | Hendrickson et al. |
| 7,756,379 B2 | 7/2010 | Kowalczyk et al. |
| 7,869,682 B2 * | 1/2011 | Kowalczyk et al. .......... 385/135 |
| 7,894,701 B2 | 2/2011 | Kowalczyk et al. |
| 2005/0213920 A1 | 9/2005 | Tanaka et al. |

(Continued)

FOREIGN PATENT DOCUMENTS

WO WO 2006/050505 A1 5/2006

OTHER PUBLICATIONS

International Search Report and Written Opinion mailed Oct. 6, 2009.
Fiber Main Distribution Frame (FMDF) Fiber Terminal Block Installation Instructions. ADC Telecommunications, Inc., Jan. 2001, pp. 1-15.
Fiber Distribution Frame Pre-Terminated Rear Load Connector Module Installation Instructions, ADC Telecommunications, Inc., Feb. 2000, pp. 1-8.

(Continued)

*Primary Examiner* — Eric Wong
(74) *Attorney, Agent, or Firm* — Merchant & Gould

(57) ABSTRACT

A fiber optic drop terminal assembly includes a housing, a spool and a fiber optic distribution cable. The housing has a first exterior surface and an oppositely disposed second exterior surface. A plurality of ruggedized adapters is mounted on the first exterior surface of the housing. The ruggedized adapters include a first port accessible from outside the housing and a second port accessible from inside the housing. The spool is engaged with the second exterior surface and includes a drum portion. The fiber distribution cable is coiled around the drum portion. The distribution cable includes a first end and an oppositely disposed second end. The second end is disposed inside the housing.

19 Claims, 31 Drawing Sheets

U.S. PATENT DOCUMENTS

| | | |
|---|---|---|
| 2006/0068633 A1 | 3/2006 | Murano |
| 2006/0093303 A1 | 5/2006 | Reagan et al. |
| 2010/0166376 A1 | 7/2010 | Nair et al. |
| 2010/0247051 A1 | 9/2010 | Kowalczyk et al. |
| 2011/0091180 A1 | 4/2011 | Kowalczyk et al. |
| 2011/0158599 A1 | 6/2011 | Kowalczyk et al. |

OTHER PUBLICATIONS

IFC Style Frame Modules, ADC Telecommunications, Inc., © 1995, "Connector Module Equipped with IFC", pp. 27.
Description of Admitted Prior Art, 30 pages.

* cited by examiner

METHODS AND SYSTEMS FOR DISTRIBUTING FIBER OPTIC TELECOMMUNICATIONS SERVICES TO LOCAL AREA

CROSS-REFERENCE TO RELATED APPLICATIONS

The present application claims priority to U.S. Provisional Patent Application Ser. No. 61/074,009 entitled "Methods and Systems for Distributing Fiber Optic Telecommunications Services to Local Area" and filed on Jun. 19, 2008 and to U.S. Provisional Patent Application Ser. No. 61/098,494 entitled "Methods and Systems for Distributing Fiber Optic Telecommunications Services to Local Area" and filed on Sep. 19, 2008. The above identified disclosures are hereby incorporated by reference in their entirety.

BACKGROUND

Fiber optic telecommunications technology is becoming more prevalent as service providers strive to deliver higher bandwidth communication capabilities to customers/subscribers. The phrase "fiber to the x" (FTTX) generically refers to any network architecture that uses optical fiber in place of copper within a local distribution area. Example FTTX networks include fiber-to-the-node (FTTN) networks, fiber-to-the-curb (FTTC) networks and fiber-to-the-premises (FTTP) networks.

FTTN and FTTC networks use fiber optic cables that are run from a service provider's central office to a cabinet serving a neighborhood. Subscribers connect to the cabinet using traditional copper cable technology such as coaxial cable or twisted pair wiring. The difference between an FTTN network and an FTTC network relates to the area served by the cabinet. Typically, FTTC networks typically have cabinets closer to the subscribers that serve a smaller subscriber area than the cabinets of FTTN networks.

In an FTTP network, fiber optic cables are run from a service provider's central office all the way to the subscriber's premises. Example FTTP networks include fiber-to-the-home (FTTH) networks and fiber-to-the-building (FTTB) networks. In an FTTB network, optical fiber is routed from the central office over an optical distribution network to an optical network terminal (ONT) located in a building. The ONT typically includes active components that convert the optical signals into electrical signals. The electrical signals are typically routed from the ONT to the subscriber's residence or office space using traditional copper cable technology. In an FTTH network, fiber optic cable is run from the service provider's central office to an ONT located at the subscriber's residence or office space. Once again, at the ONT, optical signals are typically converted into an electrical signal for use with the subscriber's devices. However, to the extent that an end user may have devices that are compatible with optical signals, conversion of the optical signal to an electrical signal may not be necessary.

FTTP networks include active optical networks and passive optical networks. Active optical networks use electrically powered equipment (e.g., a switch, router, multiplexer or other equipment) to distribute signals and to provide signal buffering. Passive optical networks use passive beam splitters instead of electrically powered equipment to split optical signals. In a passive optical network, ONT's are typically equipped with equipment (e.g., wave-division multiplexing and time-division multiplexing equipment) that prevents incoming and outgoing signals from colliding and that filters out signals intended for other subscribers.

A typical passive FTTP network includes fiber optic cables routed from a central location (e.g., a service provider's central office) to a fiber distribution hub (FDH) located in a local area such as a neighborhood. The fiber distribution hub typically includes a cabinet in which one or more passive optical splitters are mounted. The splitters each are capable of splitting a signal carried by a single fiber to a plurality of fibers. The fibers split out at the splitter are routed from the fiber distribution hub into the local area using a fiber optic distribution cable. Fibers are routed from the fiber distribution cable to subscriber locations (e.g., homes, businesses or buildings) using various techniques. For example, fiber optic drop cables can be routed directly from a breakout location on the distribution cable to an ONT at a subscriber location. Alternatively, a stub cable can be routed from a breakout location of the distribution cable to a drop terminal. Drop cables can be run from the drop terminal to ONT's located at a plurality of premises located near the drop terminal.

SUMMARY

Features of the present disclosure relate to methods and systems for efficiently and cost effectively distributing fiber optic communications services to a local area.

An aspect of the present disclosure relates to a fiber optic drop terminal assembly including a housing, a spool and a fiber optic distribution cable. The housing has a first exterior surface and an oppositely disposed second exterior surface. A plurality of ruggedized adapters is mounted on the first exterior surface of the housing. The ruggedized adapters include a first port accessible from outside the housing and a second port accessible from inside the housing. The spool is engaged with the second exterior surface and includes a drum portion. The fiber distribution cable is coiled around the drum portion. The distribution cable includes a first end and an oppositely disposed second end. The second end is disposed inside the housing.

Another aspect of the present disclosure relates a method for installing a drop terminal in a fiber optic network. The method includes mounting a drop terminal at an outdoor mounting location remote from a fiber distribution hub. The drop terminal includes a housing having a first exterior surface and an oppositely disposed second exterior surface. A plurality of ruggedized adapters is mounted on the first exterior surface of the housing. A spool is engaged with the second exterior surface. The spool includes a fiber distribution cable coiled around a drum portion of the spool. The fiber distribution cable includes a first end and an oppositely disposed second end. The method further includes pulling the first end of the fiber optic distribution cable from the spool. The housing and spool rotate in unison as the fiber distribution cable is paid out from the spool. The first end of the fiber optic distribution cable is connected to the fiber distribution hub.

Another aspect of the present disclosure relates to a method for installing a drop terminal in a fiber optic network. The method includes positioning a drop terminal proximate to a fiber distribution hub. The drop terminal includes a housing having a plurality of adapters mounted on a first exterior surface of the housing and a spool disposed on a second exterior surface. The spool includes a fiber distribution cable coiled around the spool. The fiber distribution cable includes a first end and an oppositely disposed second end. The method further includes connecting the first end of the fiber distribution cable to the fiber distribution hub and moving the drop terminal away from the fiber distribution hub such that the fiber optic distribution cable is paid out from the spool. The housing and the spool rotate in unison as the fiber optic distribution cable is paid out from the spool. The drop terminal is mounted to a mounting location remote from the fiber distribution hub.

Another aspect of the present disclosure relates to a fiber optic device. The fiber optic device includes a first spool including a core and first and second radial flanges that are axially spaced apart along the core. The first and second radial flanges project radially outwardly from the core. A second spool includes a core and first and second radial flanges that are axially spaced apart along the core of the second spool. The first and second radial flanges of the second spool project radially outwardly from the core of the second spool. The first flange of the second spool is secured to the second flange of the first spool. The second spool has a larger cable storage capacity than the first spool. A drop terminal is pivotally mounted to the first flange of the first spool. The drop terminal includes a plurality of ruggedized fiber optic adapters having outer ports that are accessible from outside the drop terminal. A distribution cable includes optical fibers linked to connectors that are inserted within inner ports of the fiber optic adapters of the drop terminal. The distribution cable has a first portion stored at the first spool and a second portion stored at the second spool.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
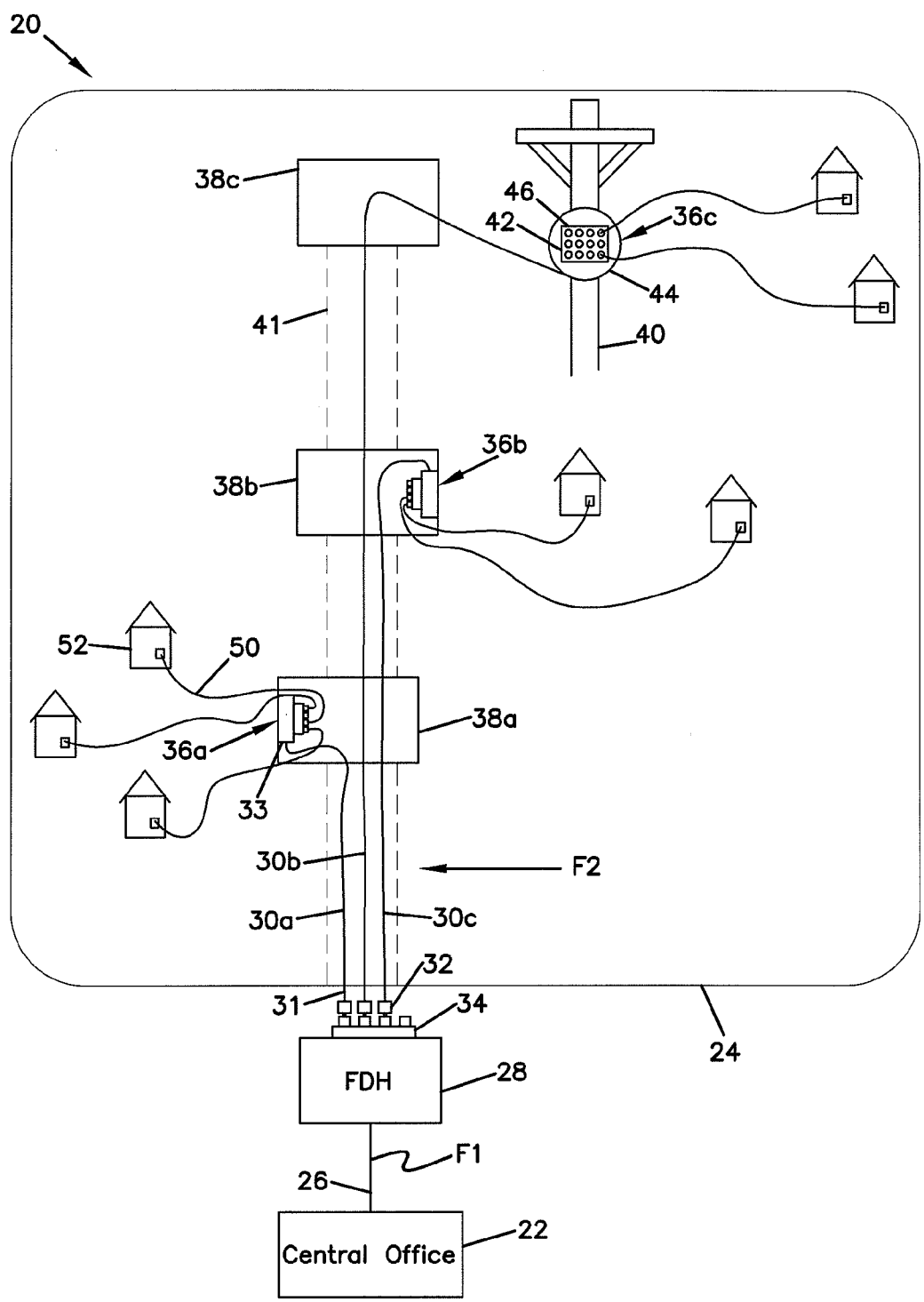
FIG. 1 shows a fiber optic network in accordance with the principles of the present disclosure.

FIG. 1 shows a passive fiber optic distribution network 20 having features that are examples of inventive aspects in accordance with the principles of the present disclosure. Generally, a distribution network 20 is adapted for transmitting fiber optic telecommunication services between a central office 22 and a local area 24 (e.g., a local loop). The distribution network includes an F1 distribution cable 26 that preferably includes a plurality of optical fibers. For example, in one embodiment, the F1 distribution cable 26 may have on the order of 12 to 48 fibers. However, alternative numbers of fibers may also be used. One or more of the optical fibers of the F1 distribution cable 26 are routed to a fiber distribution hub 28. The fiber distribution hub 28 preferably includes one or more passive optical splitters adapted to split signals carried by the fibers of the F1 distribution cable 26 into a plurality of fibers that are optically coupled to one or more F2 distribution cables 30*a-c* routed from the distribution hub 28 into the local area 24. In one embodiment, the F2 distribution cables 30*a-c* can each include 12 optical fibers. As shown at FIG. 1, the F2 distribution cables 30*a-c* include first ends 31 terminated by ruggedized multi-fiber connectors 32. The multi-fiber connectors 32 interface with a bank 34 of fiber optic adapters provided at an exterior of the fiber distribution hub 28. The adapter bank 34 facilitates quickly providing an optical connection between the optical fibers within the fiber distribution hub 28 and the optical fibers of the F2 distribution cables 30*a-c*. Fiber optic drop terminals 36*a-c* are respectively located at second ends 33 of the F2 distribution cables 30*a-c*. Drop terminal 36*a* is shown positioned within hand hole 38*a*, drop terminal 36*b* is shown mounted within hand hole 38b, and drop terminal 36c is shown mounted to a utility pole 40. The F2 distribution cables 30a-c are shown routed through an underground conduit 41 that is shown interconnecting three hand holes 38a-38c. Referring still to FIG. 1, fiber optic drop cables 50 are routed from the drop terminals 36a-c to ONT's located at subscriber locations 52.

Each of the drop terminals 36a-c includes a housing 42 and a spool 44 connected to the housing 42. A plurality of ruggedized fiber optic adapters 46 are mounted to each of the housings 42. It will be understood that the term "ruggedized" refers to a component or system that is capable of withstanding the elements of an outdoor environment and that reduces the risk of or prevents the ingress of dirt, dust, water, etc. from entering the drop terminal 36. The ruggedized fiber optic adapters 46 include first ports that are accessible from outside the housings 42 and second ports that are accessible from inside the housings 42. The fibers of the F2 distribution cables 30a-c are terminated by optical connectors that are inserted into the second ports of the ruggedized fiber optic adapters 46. In certain embodiments, the optical connectors can be terminated directly on the ends of the fibers of the F2 distribution cables 30a-c. In alternative embodiments, the optical connectors can be terminated indirectly to the ends of the optical fibers of the F2 distribution cables 30 through the use of connectorized pigtails that are spliced to the ends of the fibers of the F2 distribution cables 30a-c.

The drop cables 50 can be terminated at each end by a ruggedized optical connector. An example ruggedized optical connector is disclosed at U.S. Pat. No. 7,090,406 that is hereby incorporated by reference. The ruggedized optical connector terminated at one end of a given drop cable can be inserted into the first port of one of the drop terminals 36a-c, while the ruggedized optical connector located at the opposite end of the drop cable can be inserted into a corresponding ruggedized adapter provided at the ONT located at the subscriber location 52. In the subject embodiment, the ruggedized optical connector includes a sealing member that engages a sealing surface of the ruggedized fiber optic adapter to provide an environmental seal or a weatherproof seal between the ruggedized optical connector and the ruggedized adapter 46.

Portions of the F2 distribution cables 30a-c are preferably wrapped around the spools 44 of the drop terminals 36a-c. For example, the F2 distribution cables 30a-c may include first lengths that extend from the drop terminals 36a-c to the fiber distribution hub 28, and second lengths that are wrapped around the spool 44 corresponding to the given drop terminal 36a-c. Thus, the total length of each of the F2 distribution cables 30a-c includes the length of cable extending from the drop terminal to the fiber distribution hub 28 plus an excess length that remains wrapped around the spool 44 after installation of the drop terminal 36a-c. From the spool 44, the fibers of the multi-fiber cables 30 are routed into the interior of the housing 42 through an access opening. An environmental seal preferably is provided at the access opening. In certain embodiments, the access opening is provided at a backside of the housing while the ruggedized fiber optic adapters are provided at a front side of the housing.

Prior to installation of the local network, the installer can identify the locations where it is desired to mount drop terminals. The installer can then roughly estimate the distances from the drop terminal mounting locations to the fiber distribution hub 28. The installer can preferably select drop terminals from a supply of drop terminals having different lengths of F2 distribution cable pre-wrapped around the spools of the drop terminals. For example, drop terminals can be provided with F2 distribution cable lengths of 100 feet, 250 feet, 500 feet, 1,000 feet, 1,500 feet, 2,000 feet, 2,500 feet, 3,000 feet, etc. Thus, when a drop terminal mounting location is determined, the distance from the drop terminal location to the fiber distribution hub is estimated and a drop terminal having a pre-spooled length of F2 distribution cable sufficient to reach from the drop terminal mounting location to the fiber distribution hub is selected. Typically, because the pre-spooled lengths of F2 distribution cable are not specifically customized for each drop terminal mounting location, the spool will have a certain amount of excess cable that remains on the spool after the F2 distribution cable has been routed from the drop terminal mounting location to the fiber distribution hub.

Figure 2:
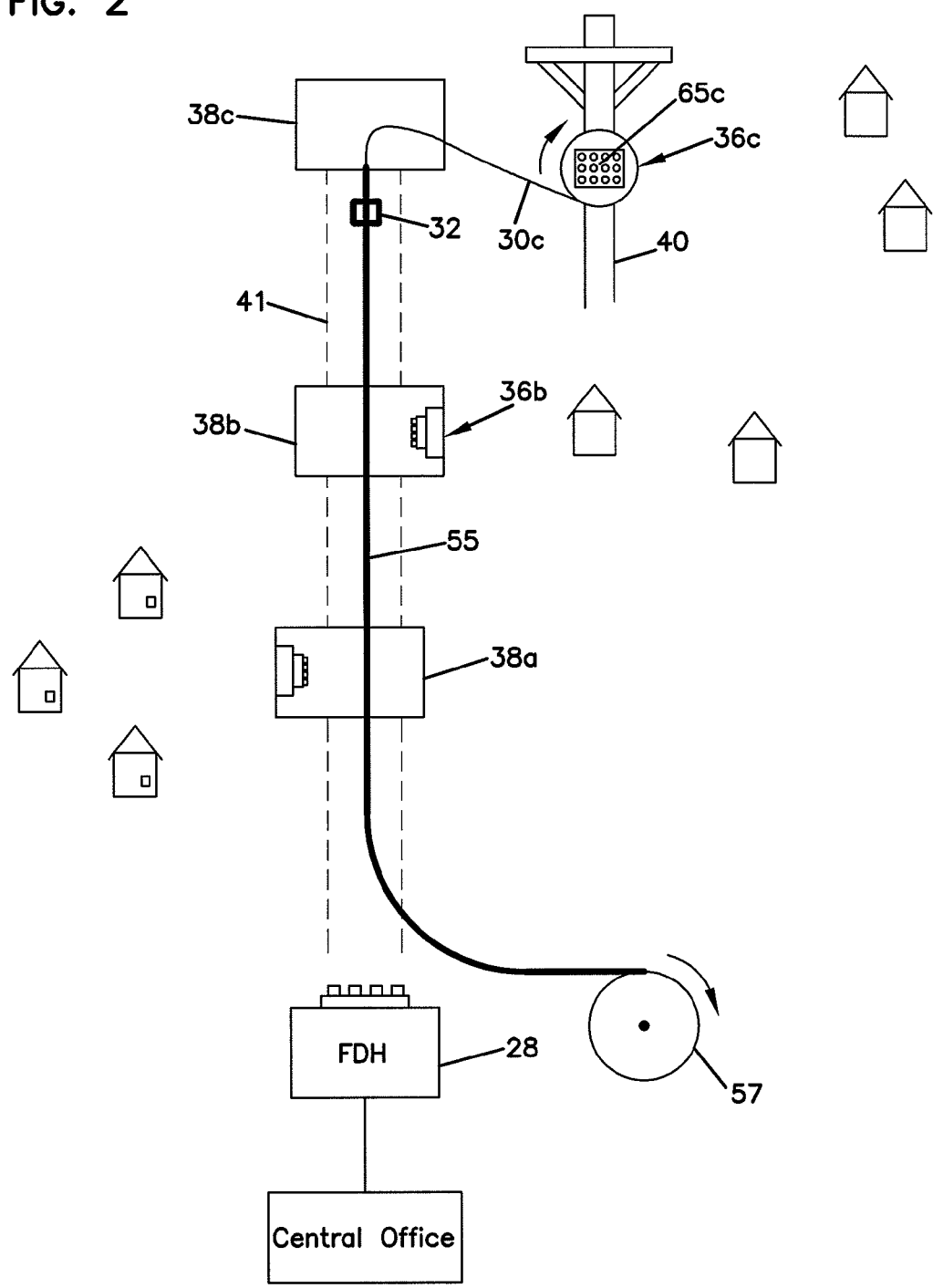
FIGS. 2-4 illustrate a sequence for installing the fiber optic network of FIG. 1.
Figure 3:
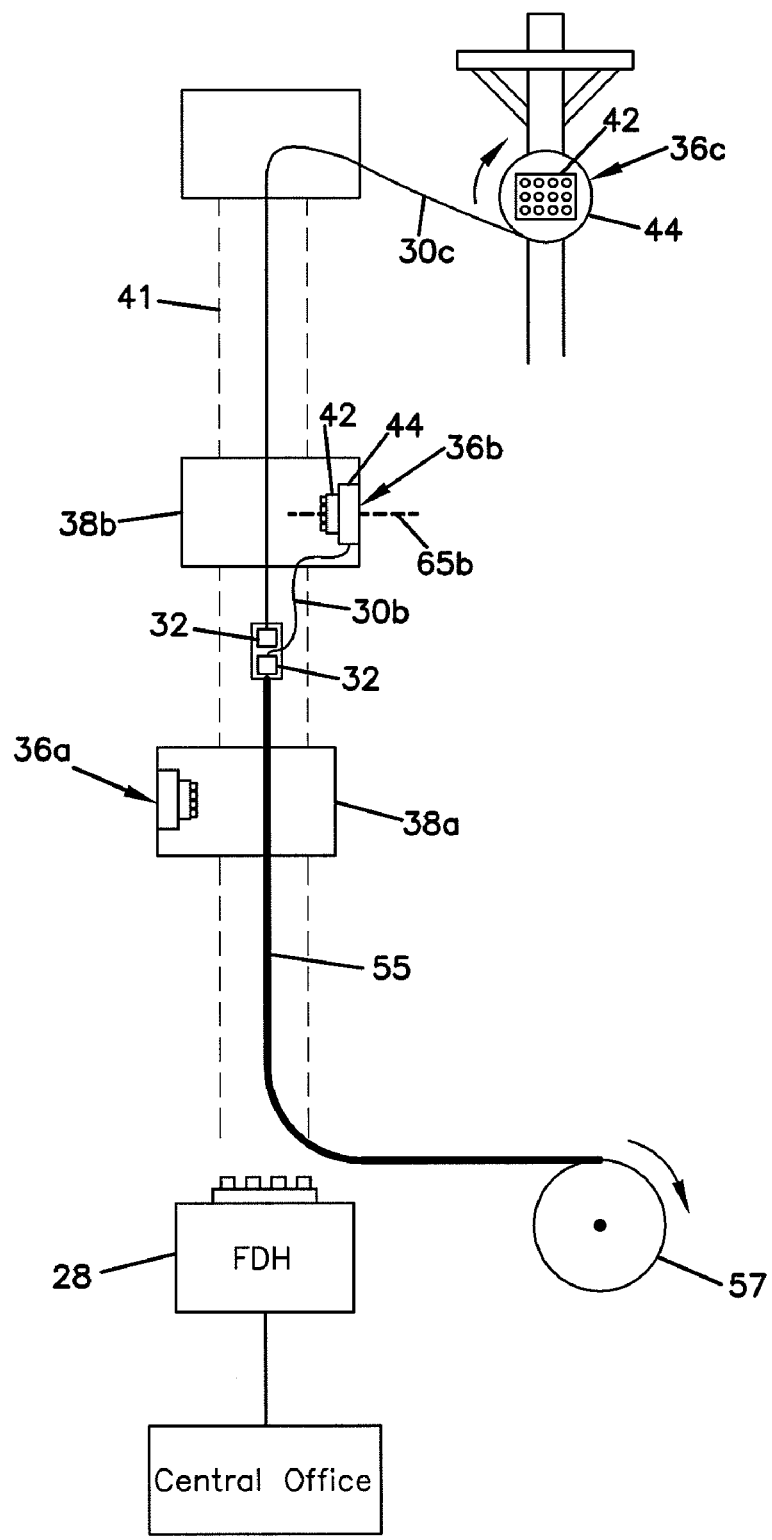
Figure 4:
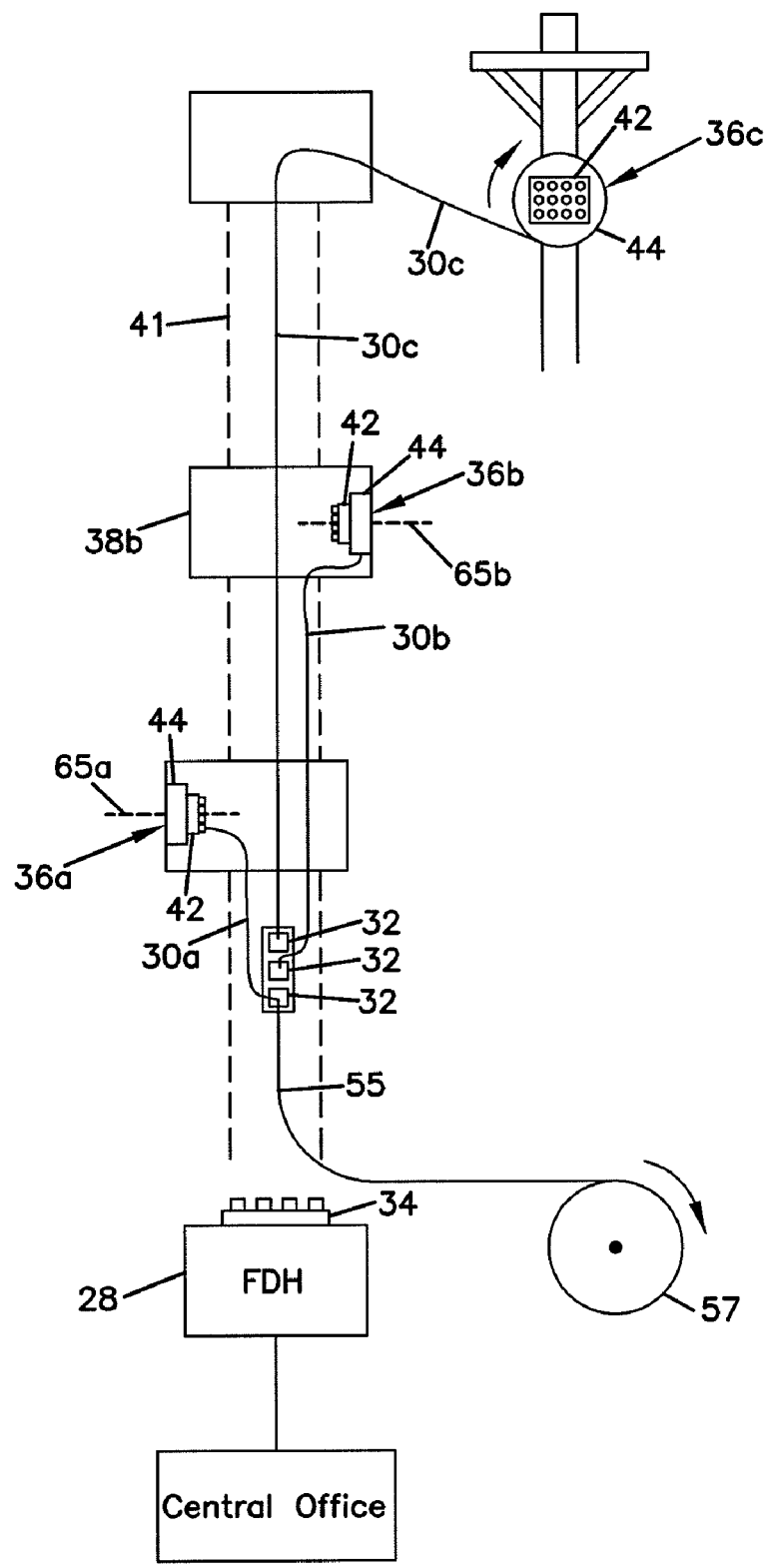

Referring now to FIGS. 1-4, the installation of the network of FIG. 1 will be described. In the subject embodiment, the installer can select three separate drop terminals 36a-c each having a pre-spooled length of F2 distribution cable that is sufficiently long to reach from the desired drop terminal mounting location to the fiber distribution hub 28. The installer can then first mount the drop terminal 36c to the utility pole 40 as shown at FIG. 2. The multi-fiber connector 32 at the end of the F2 distribution cable 30c pre-coiled about the spool 44 of the drop terminal 36c is then connected to a pulling cable 55 that has been pre-routed through the underground conduit 41. The pulling cable 55 is then used to pull the F2 distribution cable 30c through the underground conduit 41 in a direction extending from the hand hole 38c toward the hand hole 38b through the use of a cable puller 57 located near the fiber distribution hub 28. As the F2 distribution cable 30c is pulled through the conduit 41, the spool 44 and the housing 40 of the drip terminal 36c rotate in unison about a common axis 65c to allow the F2 distribution cable 30c to be paid off from the spool.

Once the multi-fiber connector 32 of the F2 distribution cable 30c reaches the hand hole 38b, the drop terminal 36b can be mounted at the hand hole 38b and the multi-fiber connector 32 of the F2 distribution cable 30b spooled about the spool 44 of the drop terminal 36b is also connected to the pulling cable 55. Thereafter, the cable puller 57 resumes pulling and both F2 distribution cables 30b and 30c are pulled together through the conduit 41 toward the hand hole 38a. As the cables 30b, 30c are pulled, the housings 42 and spools 44 of the drop terminals 36b,c rotate about respective axes 65b, 65c to allow the cables 30b,c to be paid off from the spools 44. When the multi-fiber connectors 32 of the F2 distribution cables 30b, c reach the hand hole 38a, pulling of the cable 55 stops and the operator installs the drop terminal 36a at the hand hole 38a. The multi-fiber connector 32 of the F2 distribution cable 30a wrapped around the spool 44 of the drop terminal 36a is then connected to the cable 55 and pulling resumes to pull all three cables 30a-c through the underground conduit 41 from the hand hole 38a to the fiber distribution hub 28. As the cables 30a-c are pulled, the housings 42 and spools 44 of the drop terminals 36a-c rotate about respective axes 65a-c to allow the cables 30a-c to be paid off from the spools 44. When the multi-fiber connectors 32 reach the fiber distribution hub 28, the multi-fiber connectors 32 are disconnected from the cable 55 and plugged into the adapter bank 34 of the fiber distribution hub 28. In this way, the fiber distribution hub 28 provides an interface between the optical fibers of the F1 distribution cable and the F2 distribution cables.

Figure 5:
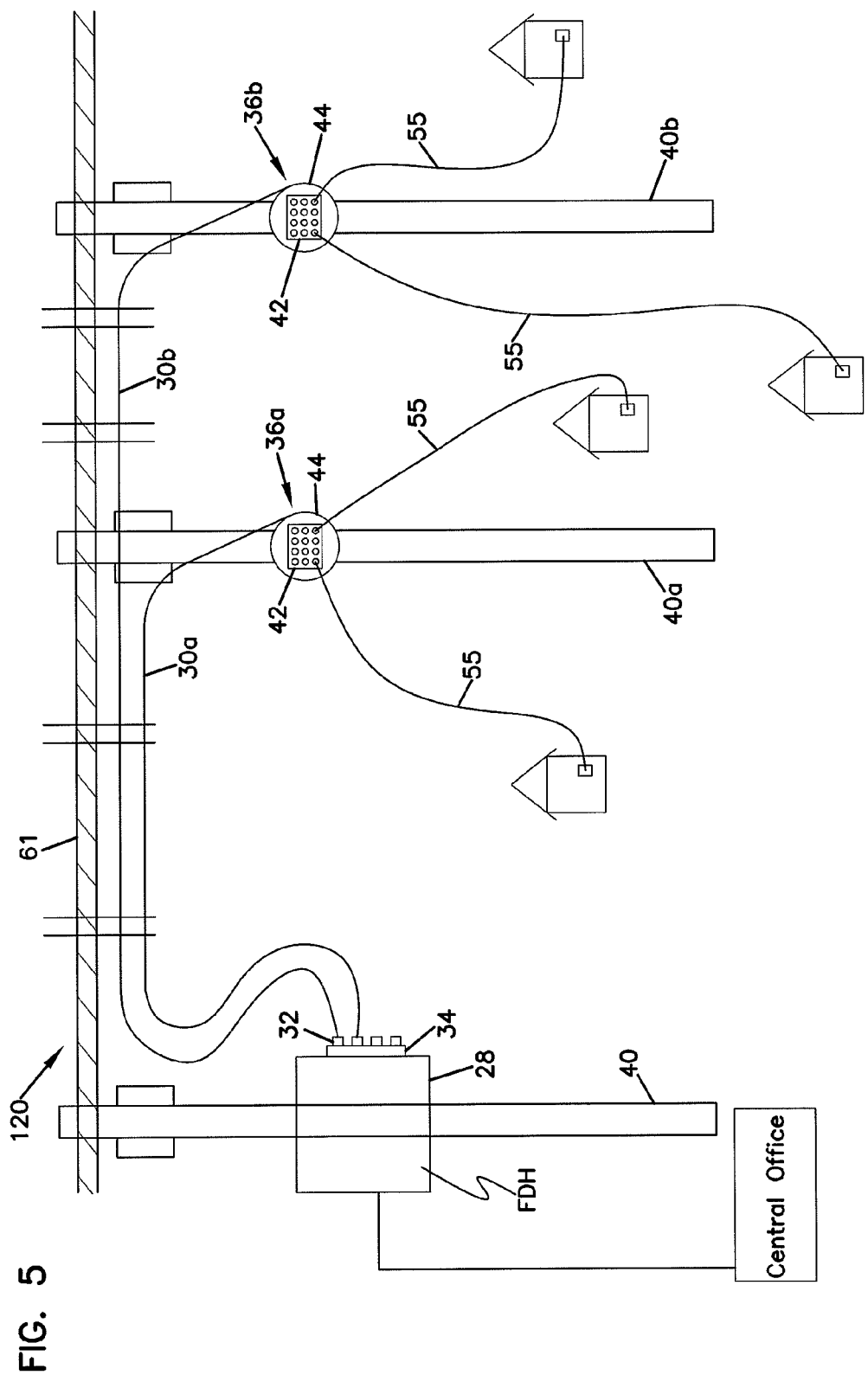
FIG. 5 shows another fiber optic network in accordance with the principles of the present disclosure.

FIG. 5 shows another fiber optic network 120 having features that are examples of inventive aspects in accordance with the principles of the present disclosure. The network 120 shows a fiber distribution hub 28 mounted on a utility pole 40 and drop terminals 36a, 36b mounted on utility poles 40a, 40b. A utility line 61 is routed across the utility poles. The drop terminals 36a, 36b have F2 distribution cables 30a, 30b that are routed from the fiber distribution hub 28 along the utility line 61 to the utility poles 40a, 40b. Typically, the F2 distribution cables 30a, 30b can be secured to the utility line 61 by conventional techniques such as lashing, tying, or other securing techniques.

Figure 6:
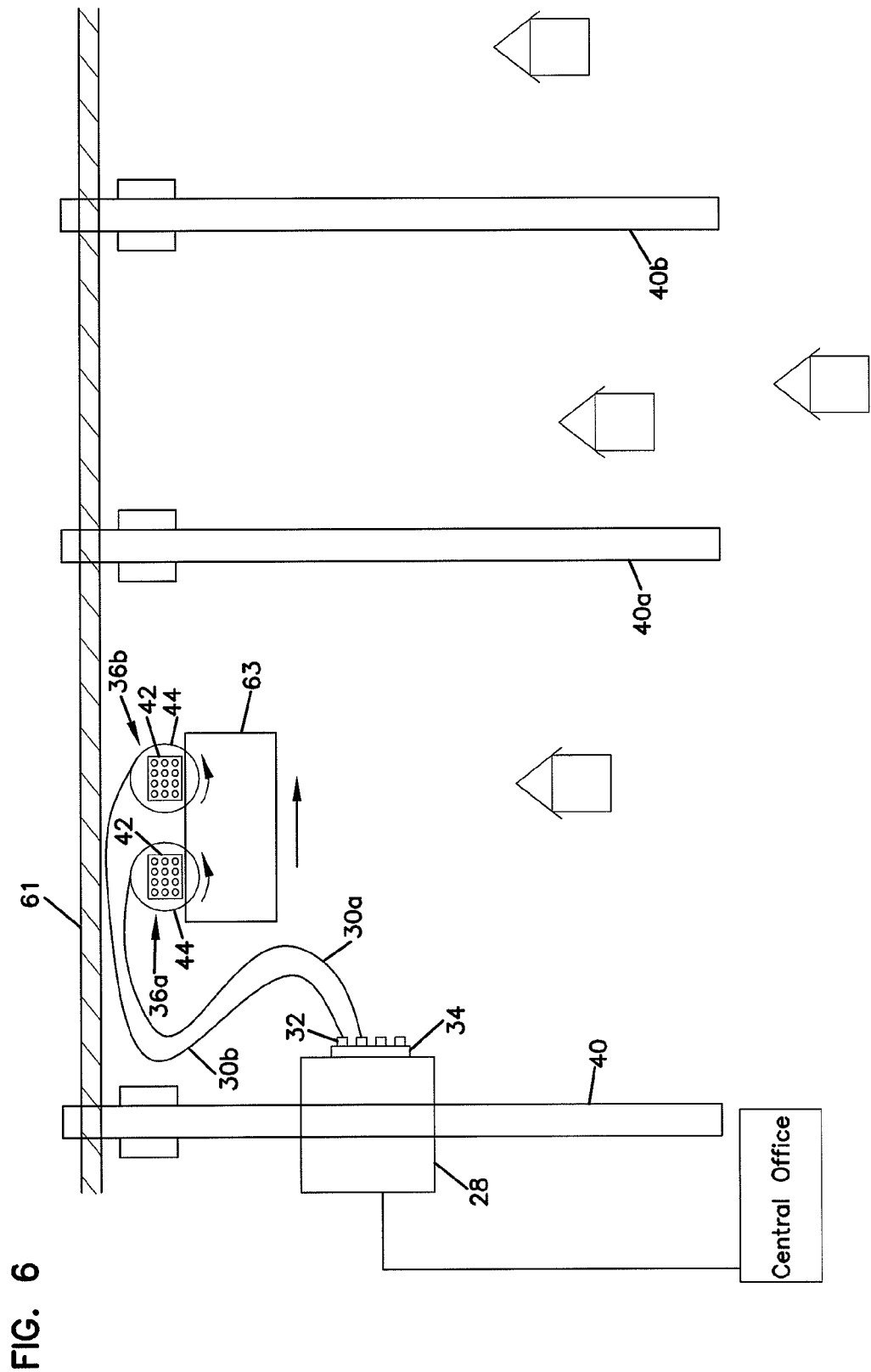
FIGS. 6 and 7 show a sequence for installing the fiber optic network of FIG. 5.
Figure 7:
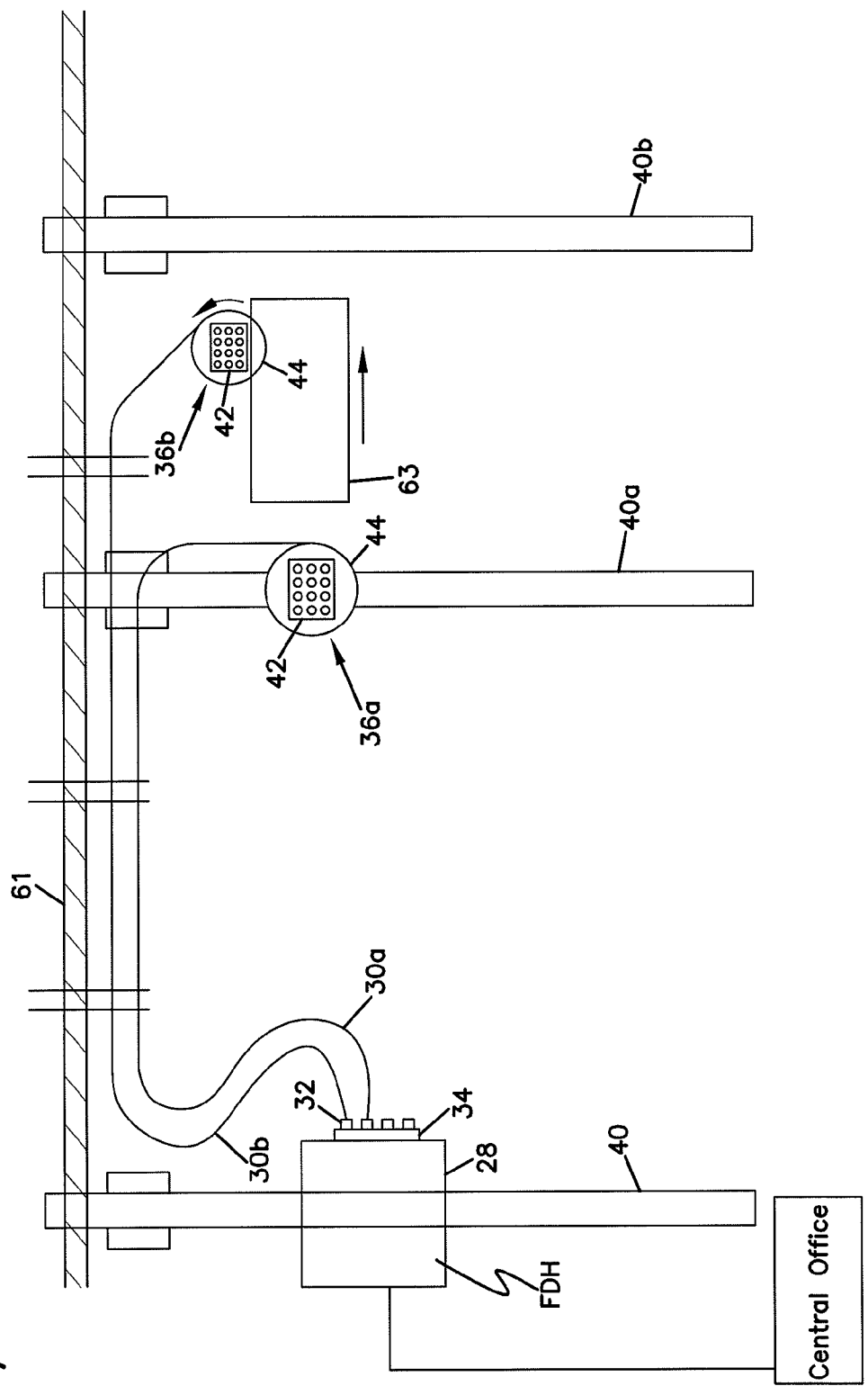

Referring now to FIGS. 6 and 7, the installation of the network 120 will be described. To install the network 120 of FIG. 5, the drop terminal mounting locations are identified and the operator selects drop terminals that are pre-spooled with a sufficient length of F2 distribution cable to reach from the fiber distribution hub 28 to the identified drop terminal mounting location. Multi-fiber connectors 32 of the F2 multi-fiber distribution cables 30a, 30b are then inserted into an adapter bank 34 of the fiber distribution hub 28. The drop terminals 36a, 36b are then mounted on an elevated carrying device 63 that carries the drop terminals 36a, 36b along the utility line 61 from pole to pole. As the elevated carrying device 63 moves the drop terminals 36a, 36b, the drop terminals housings 42 and their corresponding spools 44 rotate in unison about rotation axes 65a, 65b to allow the F2 distribution cables 30a, 30b to be paid off from the spools 44. Periodically, the elevated carrying device 63 can be stopped to allow the operator to lash the F2 distribution cables 30a, 30b to the utility line 61. When the elevated carrying device 63 reaches pole 40a, the drop terminal 36a is removed from the elevated carrying device 63 and secured to the pole 40a. Thereafter, the elevated carrying device 63 continues to move along the utility line 61 while the housing 42 and spool 44 of the drop terminal 36b spin in unison about axis 65b to allow the F2 distribution cable 30b to be paid off from the spool 44. Once again, the operator can periodically stop to lash the F2 distribution cable 30b to the utility line 61. When the elevated carrying device 63 reaches the pole 40b, the drop terminal 36b is removed from the elevated carrying device 63 and mounted to the pole 40b. Once the drop terminals 30a, 30b have been mounted to their drop terminal mounting locations, drop cables 55 can be routed from the drop terminals 30a, 30b to the ONT's of subscriber locations in need of telecommunication services.

Figure 8:
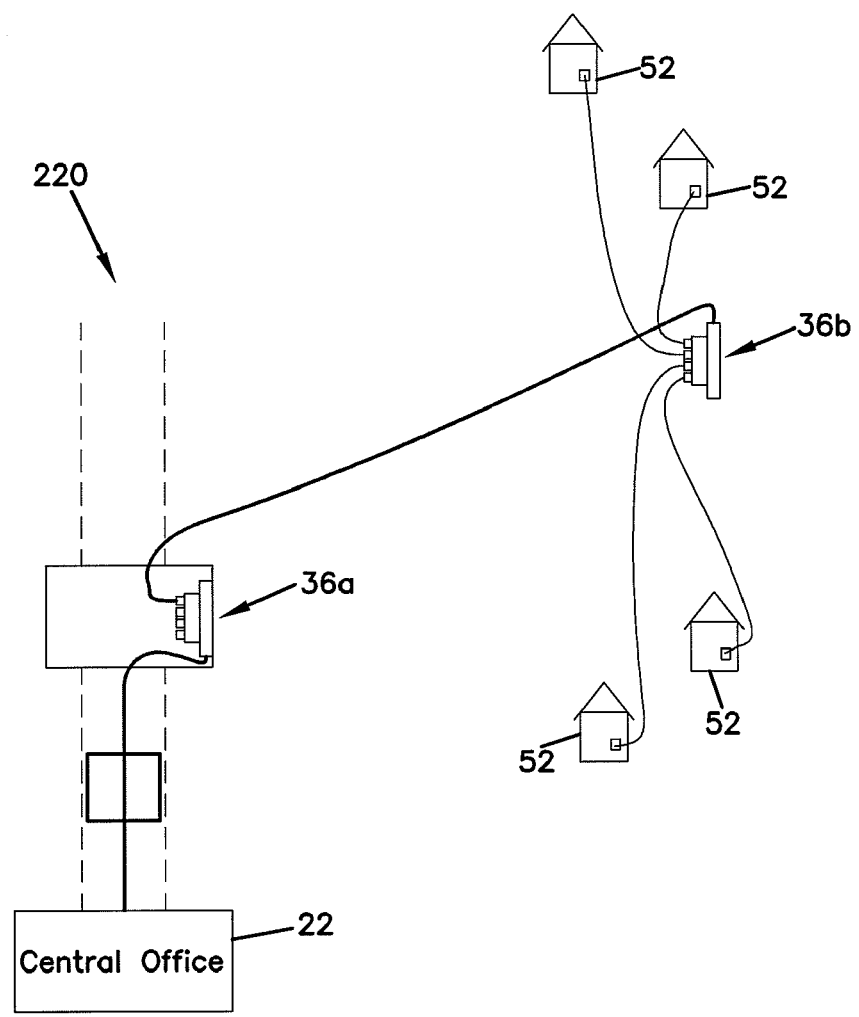
FIG. 8 shows still another fiber optic network in accordance with principles of the present disclosure.

FIG. 8 shows another fiber optic network 220 in accordance with the principles of the present disclosure. The fiber optic network of FIG. 8 has decentralized passive splitting that eliminates the need for a fiber distribution hub where all of the splitting takes place. Instead, splitters are provided within drop terminals 36a, 36b. In such an embodiment, a distribution cable (e.g., a single fiber or multi-fiber distribution cable) can be routed from a central office 22 or another intermediate location to drop terminal 36a. At the drop terminal 36a, the signal is split into a plurality of fibers that have connectorized ends inserted within inner ports of ruggedized adapters mounted at the drop terminal 36a. Another distribution cable can be plugged into the outer port of one of the adapters and routed to drop terminal 36b having a splitter therein. At the drop terminal 36b, drop cables can be routed from the ports of the drop terminal to subscriber locations 52.

To install the network 220, the drop terminals are preferably selected so as to have a sufficient amount of pre-wrapped distribution cable provided on the spools to reach from the drop terminal mounting location to the other connection location. Once the drop terminals 36a, 36b have been selected, the drop terminals 36a, 36b can be mounted at their desired locations. Thereafter, the cables can be paid off from the drop terminal spools and pulled to the desired interconnection location. As the cables are pulled, the spools 44 and the corresponding housings 42 of the drop terminals 36 rotate in unison to allow the distribution cables to be paid off from the spools 44. In the case of the drop terminal 36a, the drop terminal 36a is mounted at a desired location and then the distribution cable is pulled to the desired interconnection location where the fibers interconnect with a fiber from the central office. Thereafter, the drop terminal 36b is mounted at its desired location and its corresponding distribution cable is pulled from the drop terminal mounting location to the first drop terminal mounting location where the distribution cable is plugged into an adapter port of the drop terminal 36a.

Figure 9:
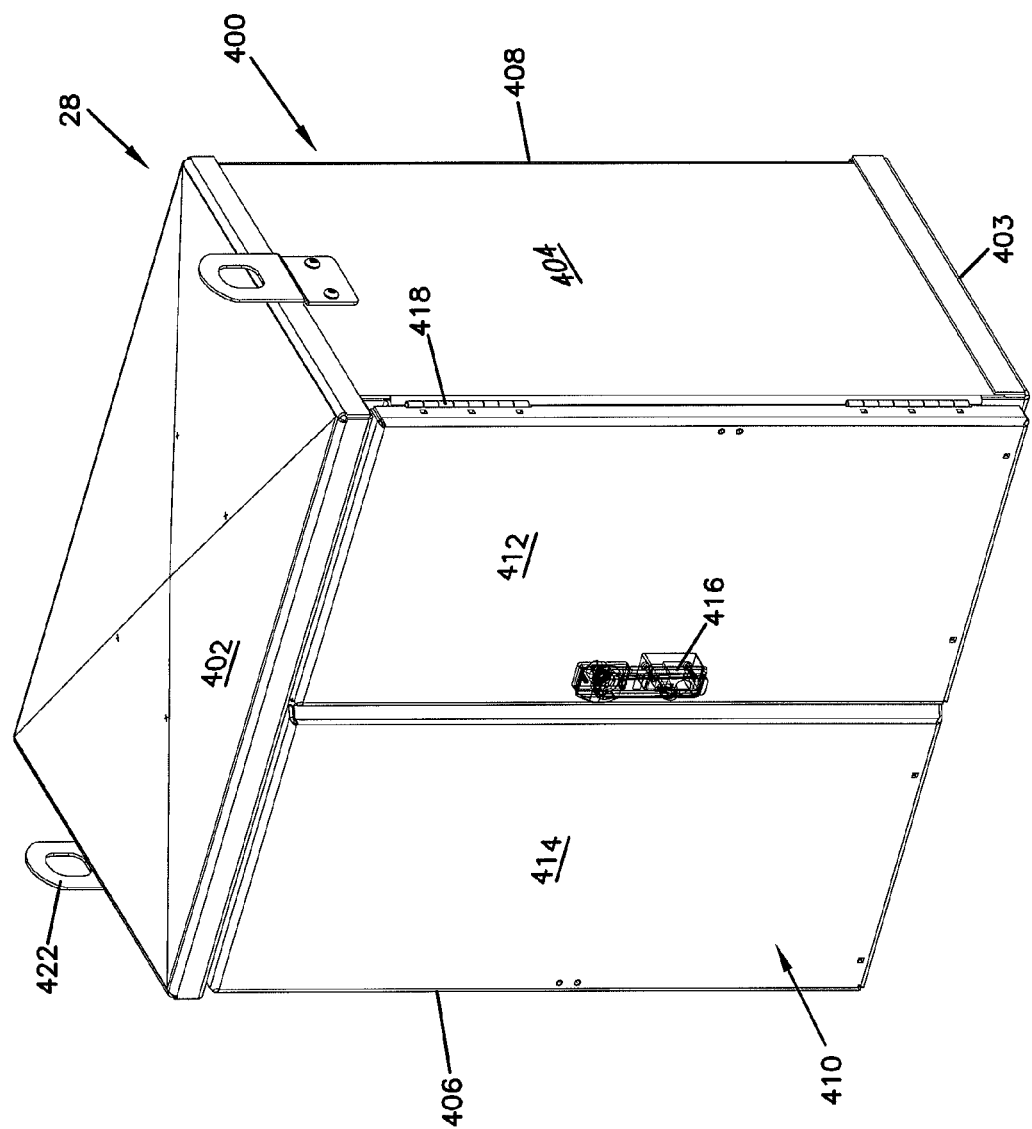
FIG. 9 is a perspective view of a fiber distribution hub suitable for use in fiber optic networks of FIGS. 1, 5 and 8 in accordance with the principles of the present disclosure.
Figure 10:
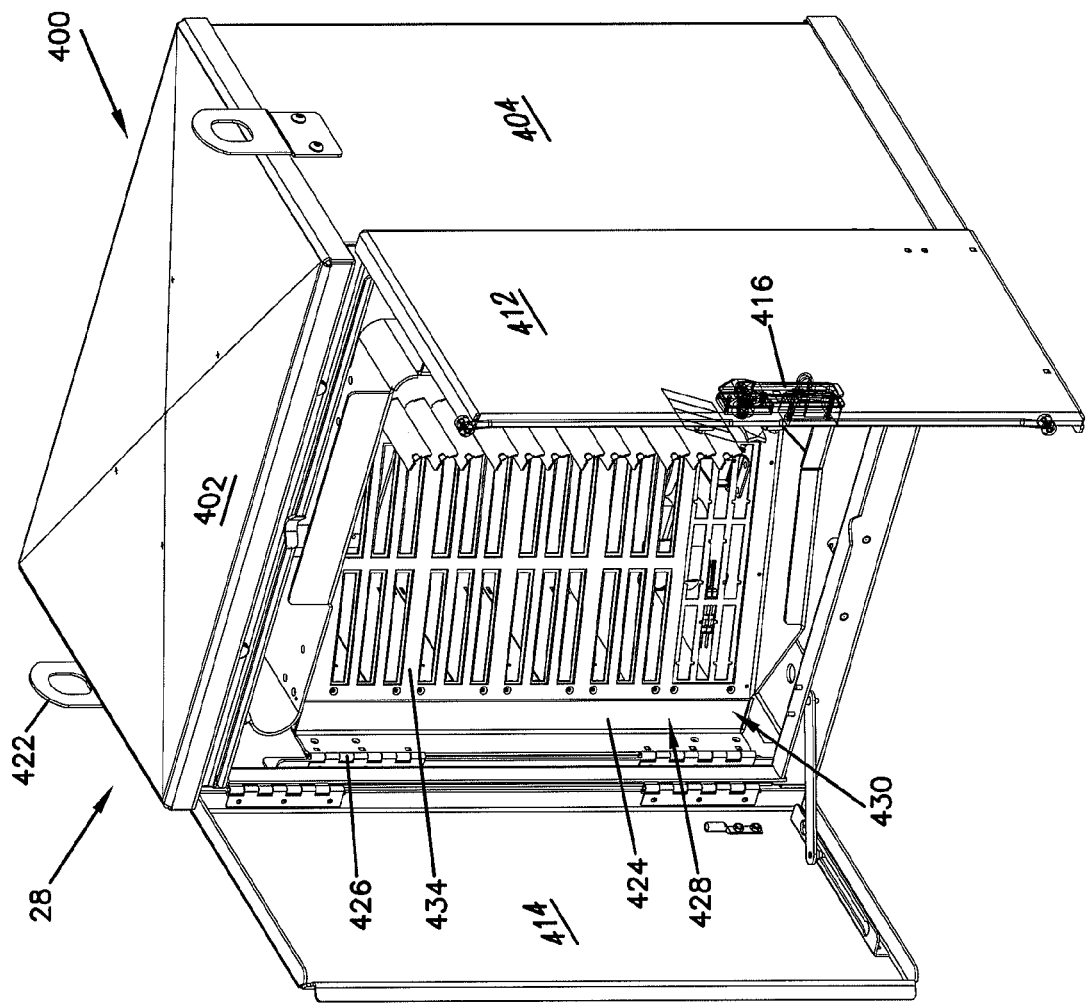
FIG. 10 is a perspective view of the fiber distribution hub of FIG. 9 with front doors in an open position.
Figure 11:
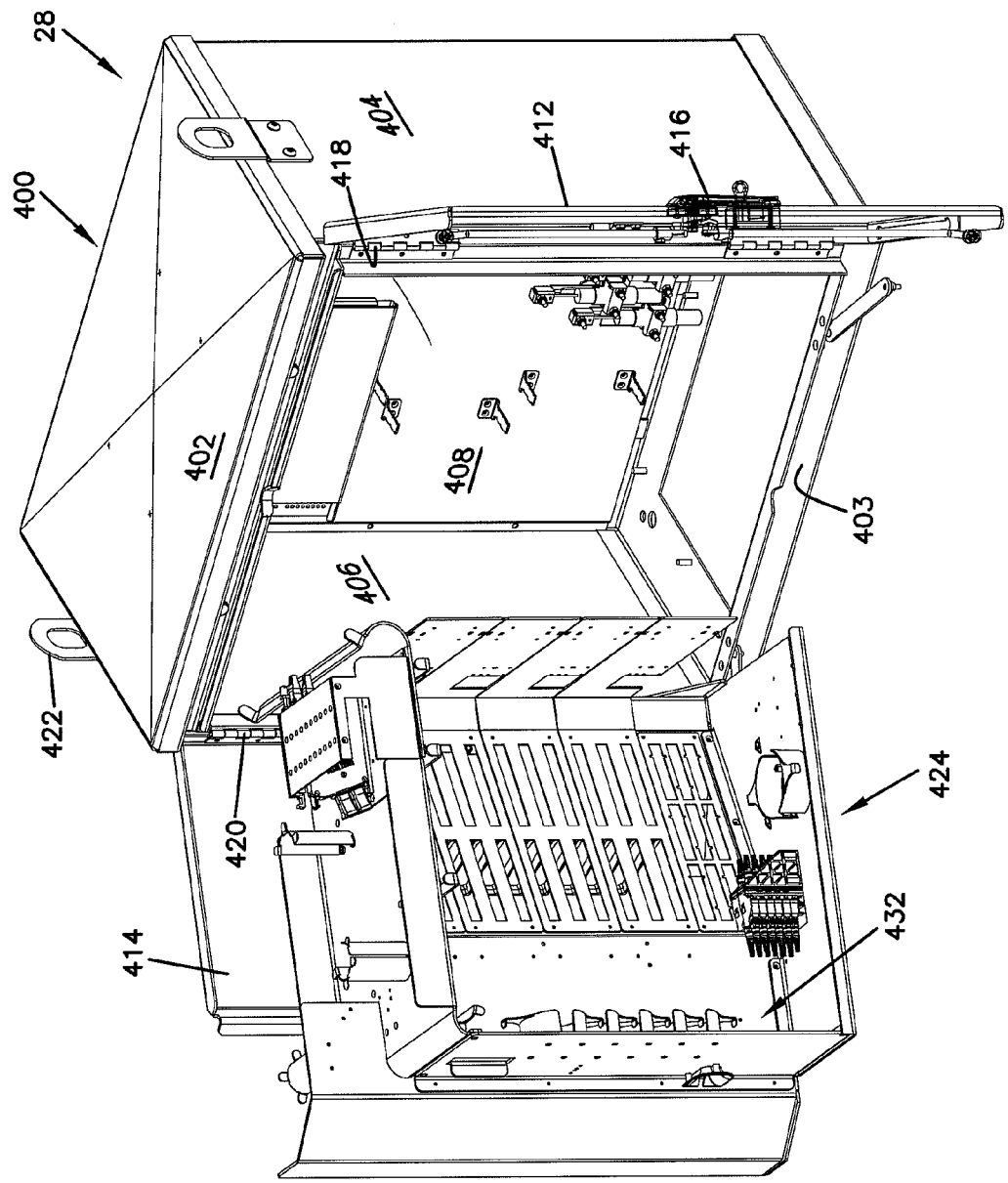
FIG. 11 is a perspective view of the fiber distribution hub of FIG. 9 with a swing frame in an open position.

Referring now to FIGS. 9-11, an exemplary configuration of the fiber distribution hub (FDH) 28 is shown. Certain aspects of the FDH shown in FIGS. 9-11 have been described in U.S. patent application Ser. No. 11/354,286, which is hereby incorporated by reference in its entirety.

The FDH 28 includes a cabinet 400 that houses internal components. The cabinet 400 of the FDH 28 includes a top panel 402, a bottom panel 403, a right side panel 404, a left side panel 406, a back panel 408, and at least one front door 410. In one embodiment, the at least one front door 410 includes a right door 412 and a left door 414. In one embodiment, the front doors 412, 414 include a lock 416. The at least one front door 410 is pivotally mounted to the cabinet 400 using hinges 418, 420 to facilitate access to the components mounted within the cabinet 400.

In general, the cabinet 400 of the FDH 28 is configured to protect the internal components against rain, wind, dust, rodents and other contaminants. However, the cabinet 400 remains relatively lightweight for easy installation, and breathable to prevent accumulation of moisture in the unit. In some embodiments, an aluminum construction with a heavy powder coat finish also provides for corrosion resistance. In one example embodiment, the cabinet 400 is manufactured from heavy gauge aluminum and is NEMA-4X rated. In other embodiments, however, other materials can also be used.

In accordance with example embodiments, the FDH 28 is provided in pole mount or pedestal mount configurations. For example, as shown in FIG. 9, loops 422 can be provided on the cabinet 400 for facilitating deployment of the cabinet 400 at a desired location. The loops 422 can be used to position the cabinet using a crane. In particular, the crane can lower the cabinet 400 into an underground region. In some embodiments, the loops 422 are removable or can be adjusted to not protrude from the top panel 402.

A swing frame 424 is pivotably mounted on hinges 426 within the cabinet 400. The swing frame 424 includes bulkhead 428 that divides the swing frame 424 into a front portion 430 and a back portion 432 (shown in FIG. 11). The bulkhead 428 includes a main panel 434 having a termination region 436 and a storage region 438. Generally, at least one termination module 440 (shown schematically in FIG. 12) is provided at the termination region 436 and at least one storage module 442 (shown schematically in FIG. 12) is provided at the storage region 438. One or more distribution cable interfaces 444 can be positioned within the back portion 432 of the swing frame 424. At least one splitter module housing 446 accommodating one or more splitter modules 448 is positioned at the top of the swing frame 424.

Figure 12:
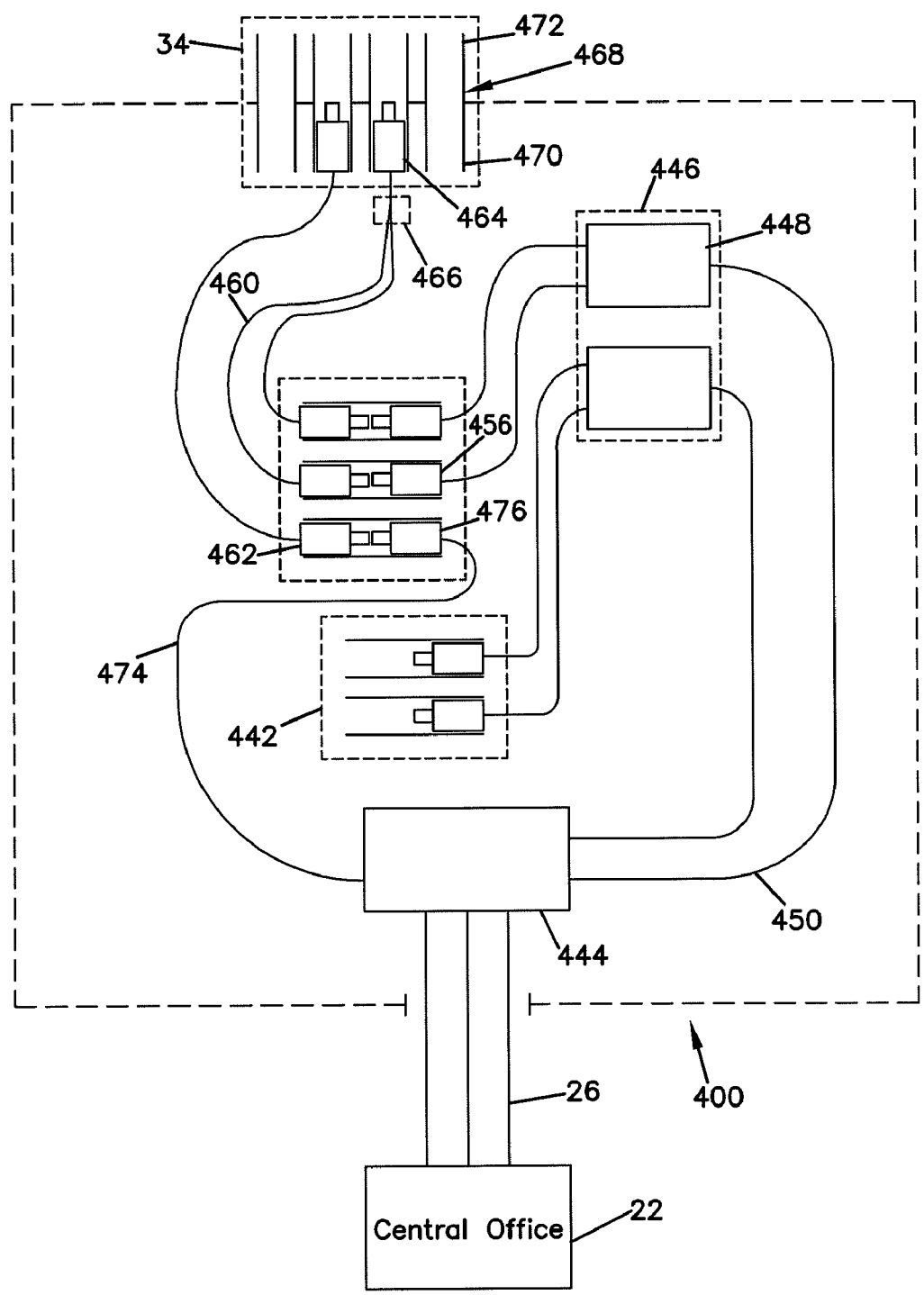
FIG. 12 is a schematic representation of the fiber distribution hub suitable for use in fiber optic networks of FIGS. 1, 5 and 8 in accordance with the principles of the present disclosure.

Referring now to FIG. 12, a schematic diagram of an example cable routing scheme for the FDH 28 is shown. The FDH 28 generally administers connections at a termination panel between incoming fiber and outgoing fiber in an Outside Plant (OSP) environment. As the term is used herein, "a connection" between fibers includes both direct and indirect connections. Examples of incoming fibers include the F1 distribution cable fibers that enter the cabinet and intermediate fibers (e.g., connectorized pigtails extending from splitters and patching fibers/jumpers) that connect the F1 distribution cable fiber to the termination panel. Examples of outgoing fibers include the F2 distribution cable fibers that exit the cabinet and any intermediate fibers that connect the F2 distribution cable fibers to the termination panel. The FDH 28 provides an interconnect interface for optical transmission signals at a location in the network where operational access and reconfiguration are desired. For example, as noted above, the FDH 28 can be used to split the F1 distribution cables and terminate the split F1 distribution cables to F2 distribution cables. In addition, the FDH 28 is designed to accommodate a range of alternative sizes and fiber counts and support factory installation of pigtails, fanouts and splitters.

As shown in FIG. 12, the F1 distribution cable 26 is initially routed into the FDH 28 through the cabinet 400 (e.g., typically through the back or bottom of the cabinet 400 as shown in FIG. 12). In certain embodiments, the fibers of the F1 distribution cable 26 can include ribbon fibers. An example F1 distribution cable 26 may include twelve to forty-eight individual fibers connected to the central office 22. In some embodiments, after entering the cabinet 400, the fibers of the F1 distribution cable 26 are routed to the distribution cable interface 444 (e.g., fiber optic adapter modules, a splice tray, etc.). At the distribution cable interface 444, one or more of the fibers of the F1 distribution cable 26 are individually connected to separate splitter input fibers 450. The splitter input fibers 450 are routed from the distribution cable interface 444 to the splitter module housing 446. At the splitter module housing 446, the splitter input fibers 450 are connected to separate splitter modules 448, wherein the splitter input fibers 450 are each split into multiple pigtails 454, each having connectorized ends 456. In other embodiments, however, the fibers of the F1 distribution cable 26 can be connectorized and can be routed directly to the splitter modules 448 thereby bypassing or eliminating the need for the distribution cable interface 444.

When the pigtails 454 are not in service, the connectorized ends 456 can be temporarily stored on the storage module 442 that is mounted at the storage region 438 of the swing frame 424. When the pigtails 454 are needed for service, the pigtails 454 are routed from the splitter modules 448 to the termination module 440 that is provided at the termination region 436 of the swing frame 424. At the termination module 440, the pigtails 454 are connected to fibers of an F2 distribution pigtail 460. The F2 distribution pigtail 460 includes a plurality of single fiber connectorized ends 462 on one end and a multi-fiber connectorized end 464 on an opposite end of the F2 distribution pigtail 460. In one embodiment, the fibers of the F2 distribution pigtail 460 are routed to a fanout 466 where the individual fibers of the F2 distribution pigtail 460 are brought together. The multi-fiber connectorized end 464 of the F2 distribution pigtail 460 is adapted for engagement with a multi-fiber optic adapter 468 disposed in the adapter bank 34, which in the subject embodiment extends through the cabinet 400. The multi-fiber optic adapter 468 includes an interior port 470 and an exterior port 472. The interior port 470 of the fiber optic adapter 468 is accessible from the interior of the cabinet 400 while the exterior port 472 is accessible from the exterior of the cabinet 400. As the intermediate cable is disposed in the interior of the cabinet 400, the multi-fiber connectorized end 466 of the intermediate cable 464 is engaged with the interior port 470 of the multi-fiber optic adapter 468. The multi-fiber connector 32 of the F2 distribution cable 30 is adapted for engagement with the exterior port 472 of the multi-fiber optic adapter 468.

In one embodiment, one or more of the fibers of the F1 distribution cable 26 are not connected to any of the splitter modules 448. Rather, these fibers of the F1 distribution cable 26 are connected to pass-through fibers 474 having connectorized ends 476. The pass-through fibers 474 are connected to the termination modules 440, without first connecting to the splitter modules 452. By refraining from splitting the fiber 474, a stronger signal can be sent to one of the subscribers. The connectorized ends 476 of the pass-through fibers 474 can be stored at the storage region 438 when not in use.

Figure 13:
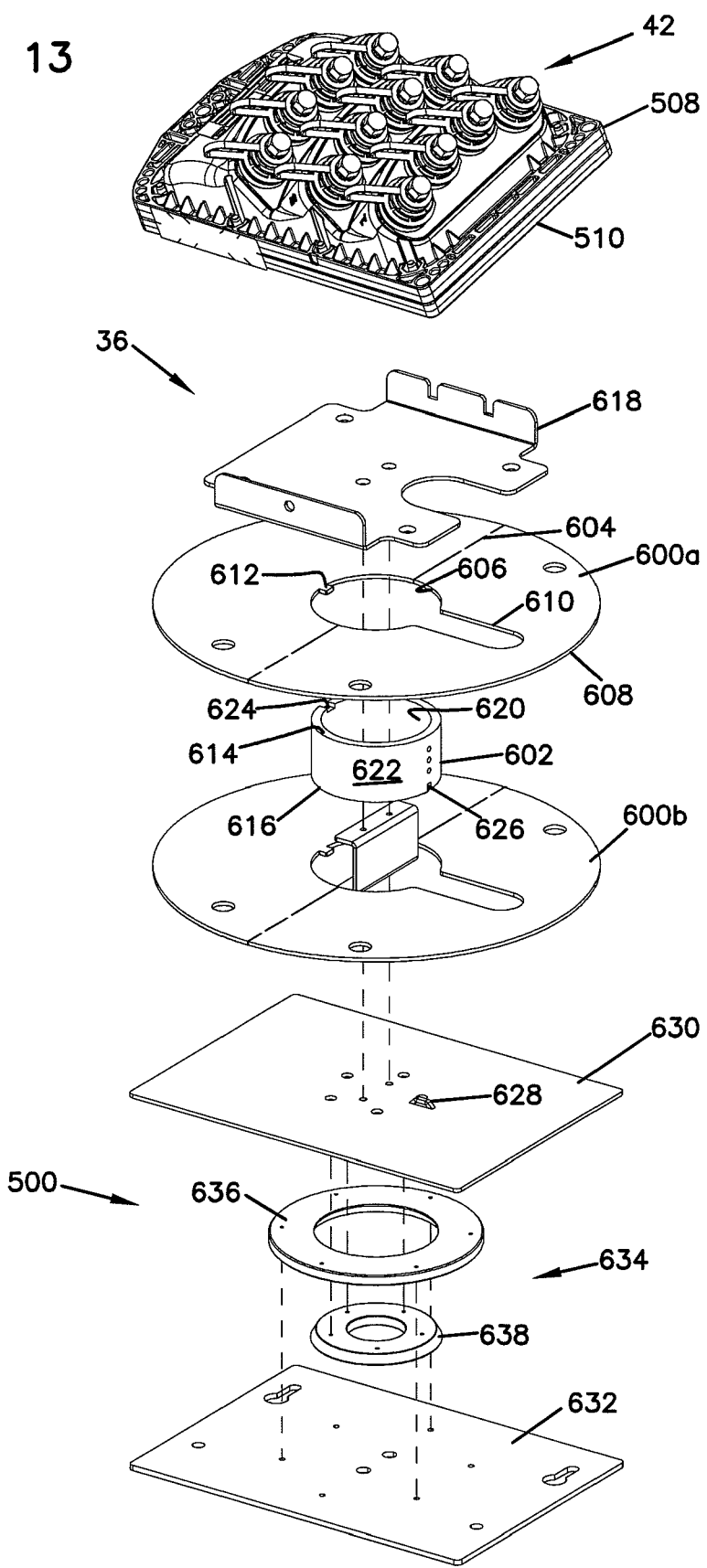
FIG. 13 is an exploded perspective view of a drop terminal suitable for use in the fiber optic networks of FIGS. 1, 5 and 8.

Referring now to FIG. 13, an exemplary configuration of the drop terminal 36 is shown. The drop terminal 36 includes the housing 42, the spool 44 disposed on an exterior surface of the housing 42 and a mounting assembly 500 adapted for rotational engagement with the spool 44.

Figure 14:
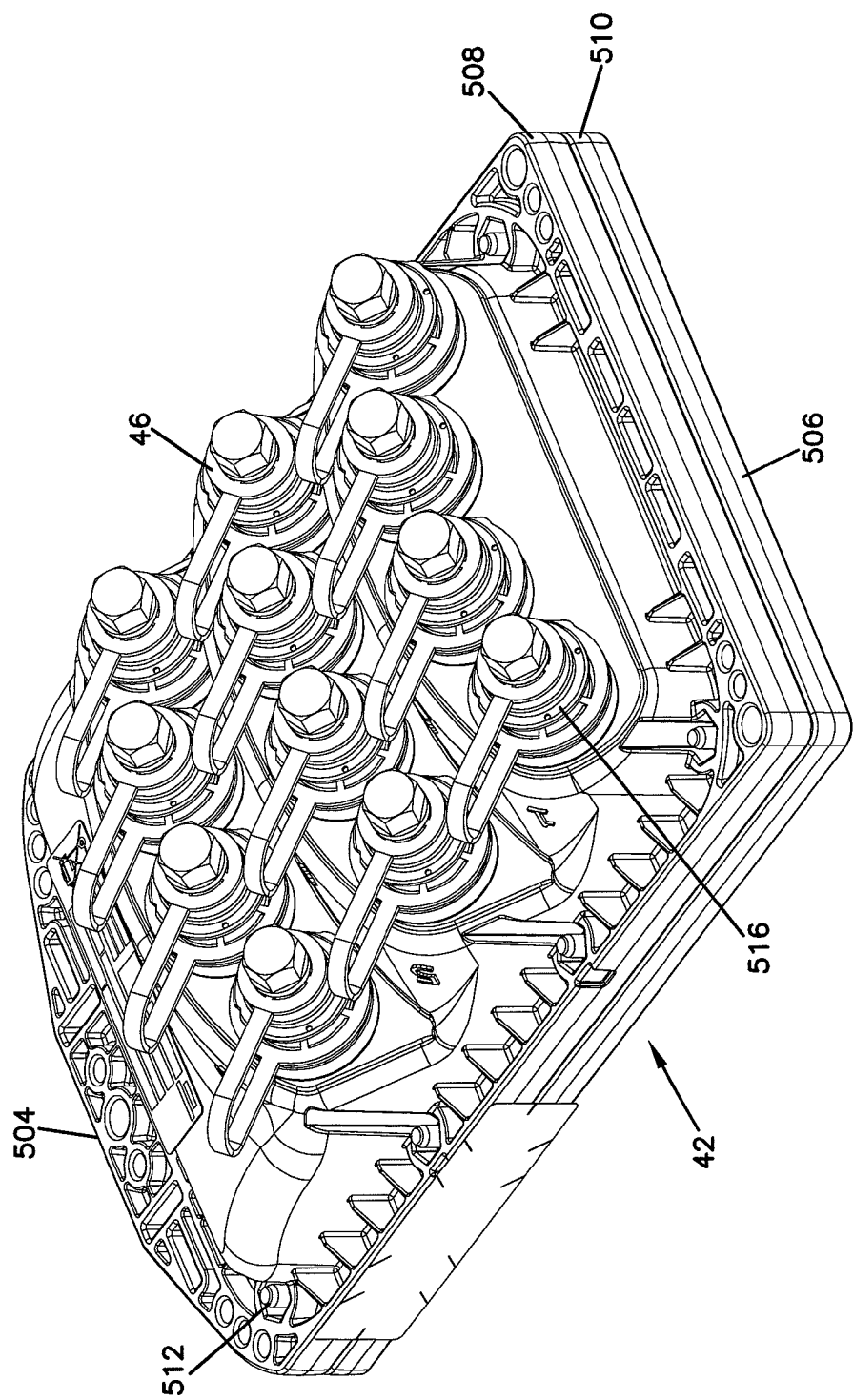
FIG. 14 is a perspective view of a housing suitable for use with the drop terminal in the fiber optic networks of FIGS. 1, 5 and 8.
Figure 15:
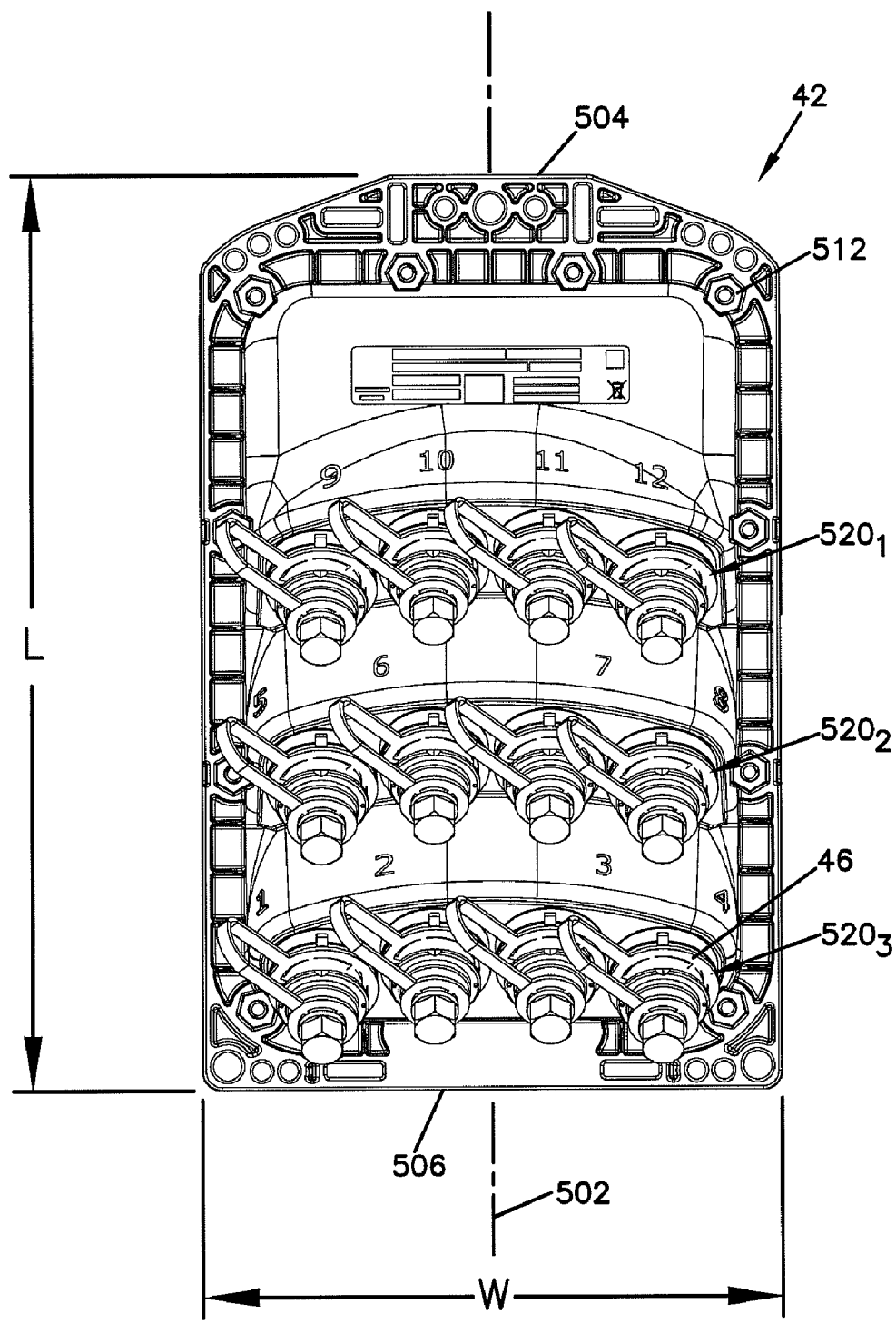
FIG. 15 is a front view of the housing of FIG. 14.
Figure 16:
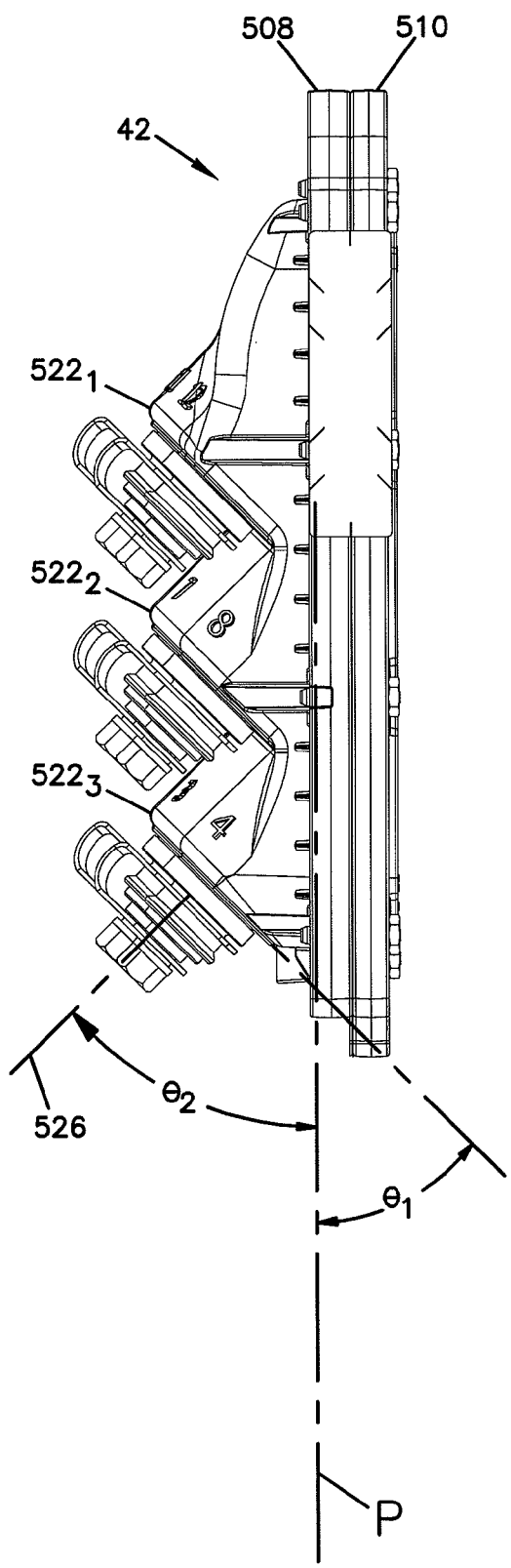
FIG. 16 is a side view of the housing of FIG. 14.

Referring now to FIGS. 14-16, an exemplary configuration of the housing 42 of the drop terminal 36 is shown. The drop terminal shown in FIGS. 13-15 has been has been described in U.S. patent application Ser. No. 11/728,043 (now U.S. Pat. No. 7,512,304), the disclosure of which is hereby incorporated by reference in its entirety.

The housing 42 of the drop terminal 36 includes a central longitudinal axis 502 that extends from a first end 504 to a second end 506 of the housing 42. The housing 42 includes a front piece 508 and a back piece 510 that cooperate to define an enclosed interior of the housing 42. The front and back pieces 508, 510 are joined by fasteners 512 (e.g., bolts or other fastening elements) spaced about a periphery of the housing 42. The front and back pieces 508, 510 are elongated along the central axis 502 so as to extend generally from the first end 504 to the second end 506 of the housing 42.

The drop terminal 36 is environmentally sealed. In the subject embodiment, the drop terminal 36 includes a gasket mounted between the front and back pieces 508, 510 of the housing 42. The gasket extends around the perimeter or periphery of the housing 42 and prevents moisture from entering the enclosed interior of the assembled housing 42.

Figure 17:
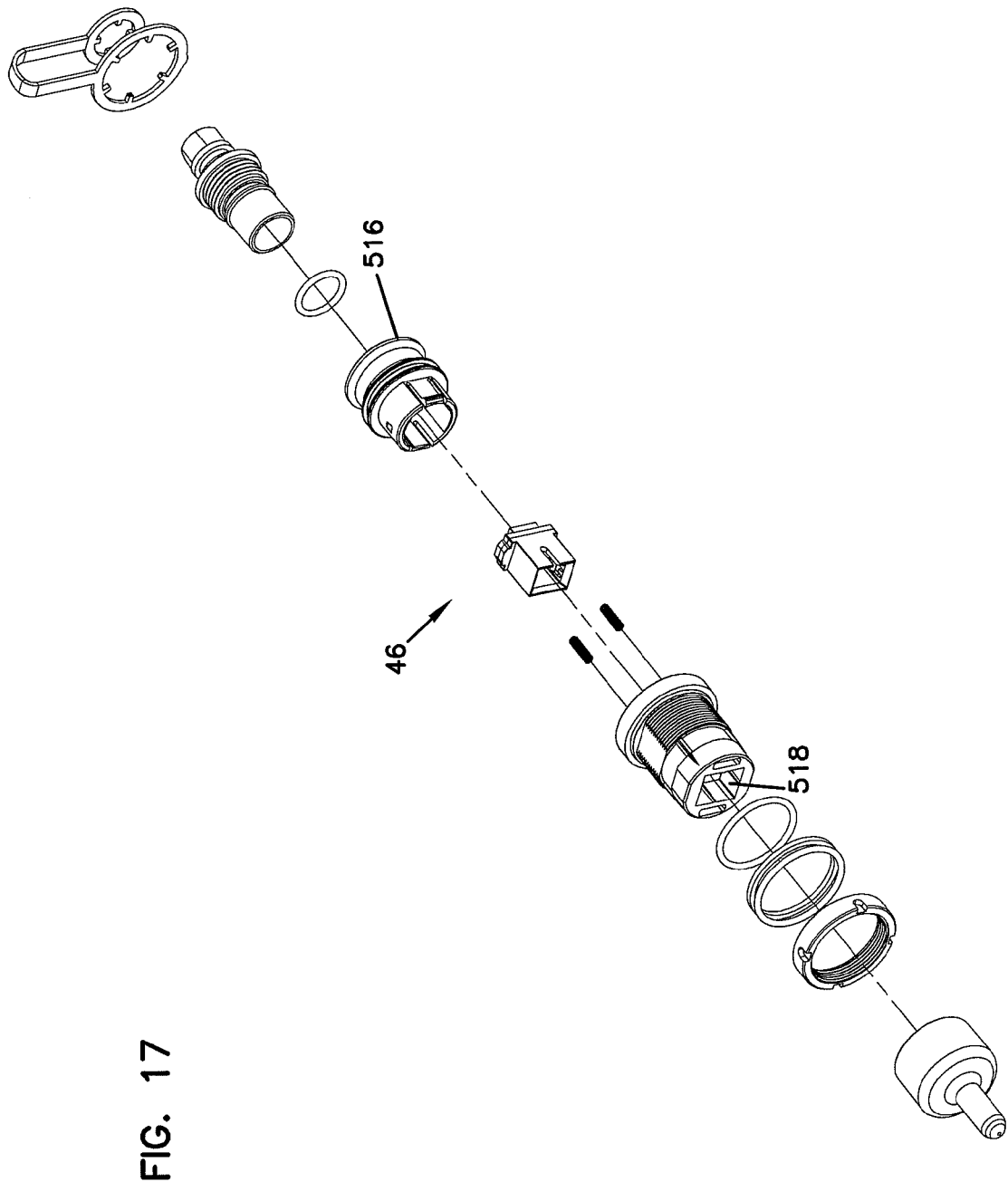
FIG. 17 is an exploded view of a ruggedized fiber optic adapter suitable for use with the drop terminal of FIG. 13.

The housing 42 of the drop terminal 36 also includes the plurality of ruggedized fiber optic adapters 46 mounted to the front piece 508 of the housing 42. As best shown in FIG. 17, each of the ruggedized fiber optic adapters 46 include the first port 516 accessible from outside the housing 42 and the second port 518 accessible from within the housing 42.

The housing 42 of the drop terminal 36 includes a length L and a width W. The length L is parallel to the central longitudinal axis 502 of the housing 42. In the subject embodiment, first, second and third rows $520_1$-$520_3$ of the ruggedized fiber optic adapters 46 are mounted to the front piece 508 of the housing 42. Each of the first, second and third rows $520_1$-$520_3$ includes four ruggedized fiber optic adapters 46 spaced-apart across the width W of the housing 42. It will be understood, however, that the scope of the present disclosure is not limited to the housing 42 of the drop terminal 36 having first, second and third rows $520_1$-$520_3$ or to the housing 42 having four ruggedized fiber optic adapters 46 per row.

In the subject embodiment, the first row $520_1$ is located closest the first end 504 of the housing 42, the third row $520_3$ is located closest the second end 506 of the housing 42 and the second row $520_2$ is located between the first and third rows $520_1$, $520_3$. The front face of the front piece 508 has a stepped configuration with three steps $522_1$-$522_3$ positioned consecutively along the length L of the housing 42. Each step $522_1$-$522_3$ includes an adapter mounting wall $524_1$-$524_3$ defining adapter mounting openings in which the ruggedized fiber optic adapters 46 are mounted. A sealing member 523 (shown in FIG. 17) is compressed between a main housing 525 of the ruggedized fiber optic adapter 46 and the adapter mounting wall $524_1$-$524_3$ to provide an environmental seal about the adapter mounting opening.

As shown at FIG. 15, the adapter mounting walls $524_1$-$524_3$ are generally parallel to one another and are spaced apart along the length L of the housing 42. The adapter mounting walls $524_1$-$524_3$ have front faces that are aligned at an oblique angle $\theta_1$ relative to a plane P that extends through the central longitudinal axis 502 and across the width W of the housing 42. The angled configuration of the adapter mounting walls 524 causes the ruggedized fiber optic adapters 46 to be angled relative to the plane P. For example, center axes 526 of the ruggedized fiber optic adapters 46 are shown aligned at an oblique angle $\theta_2$ relative to the plane.

Figure 18:
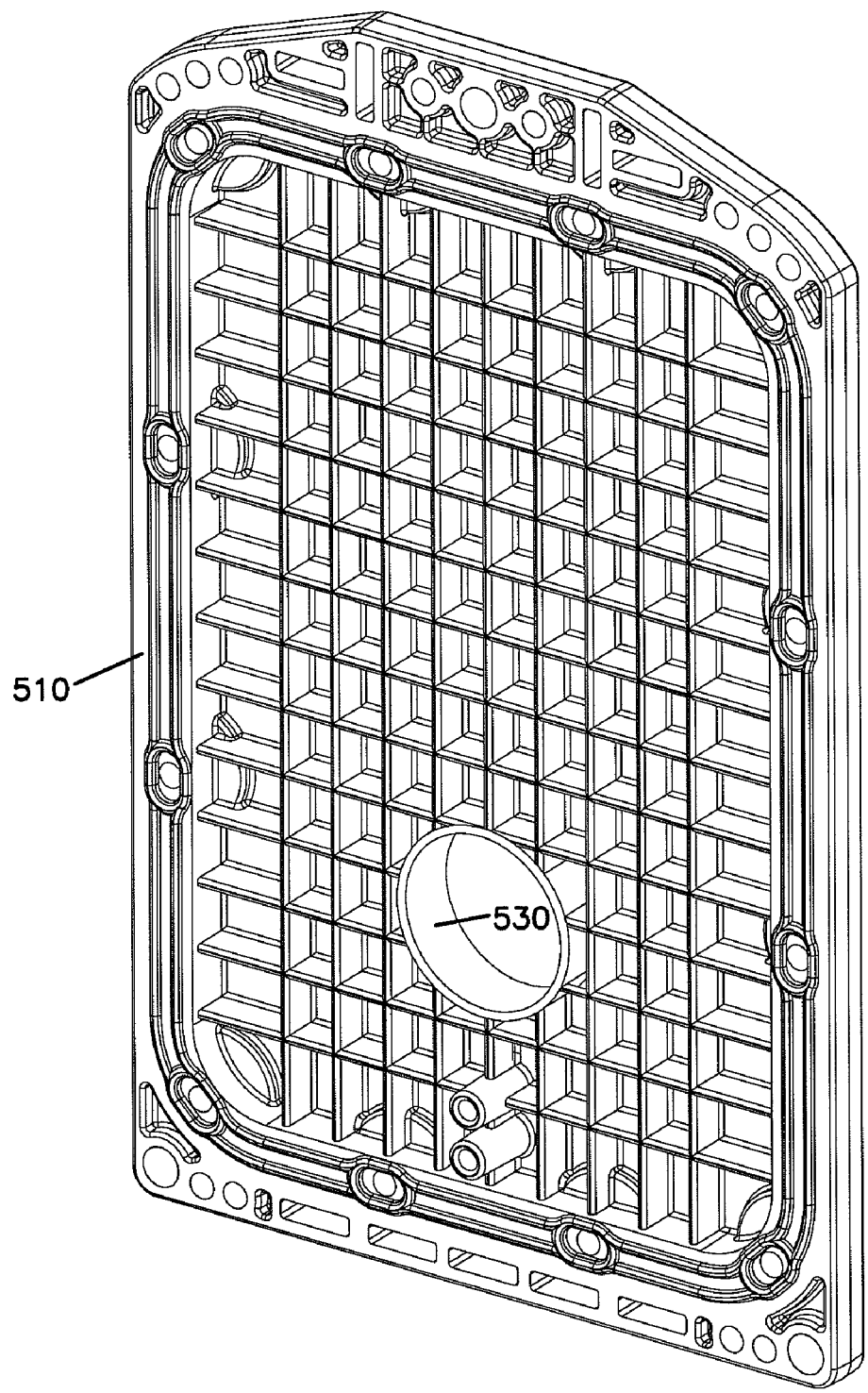
FIG. 18 is a perspective view of a back piece of the housing of FIGS. 14-16.

Referring now to FIG. 18, the back piece 512 of the housing 42 is shown. The back piece 512 defines a cable passage 530 that extends through the back piece 512. The cable passage 530 is adapted to allow the distribution cable 30 to enter/exit the interior of the housing 42. In one embodiment, the cable passage 530 is adapted to receive a cable seal through which the distribution cable 30 passes. The cable seal is adapted to be in sealing engagement with the distribution cable 30 and the cable passage 530 to prevent the ingress of dirt, dust, water, etc. from entering the drop terminal 36 through the cable passage 530.

Referring now to FIG. 13, the spool 44 includes a first end 600a, an oppositely disposed second end 600b, and a drum portion 602 around which the F2 distribution cable 30 is coiled or wrapped. A spool 44 suitable for use with the drop terminal 36 has been described in U.S. patent application Ser. No. 12/113,786, the disclosure of which is hereby incorporated by reference in its entirety.

In the subject embodiment, the first end 600a is disposed adjacent to the back piece 510 of the housing 42. In one embodiment, the first end 600a is sealingly engaged with the back piece 510.

In the depicted embodiment, the first and second spool ends 600a, 600b of the spool 44 are substantially similar. As the first and second ends 600a, 600b in the subject embodiment are substantially similar, the first and second ends 600a, 600b shall be referred to as spool end 600 in both singular and plural tense as required by context. It will be understood, however, that the scope of the present disclosure is not limited to the first and second ends 600a, 600b being substantially similar.

Each spool end 600 is adapted to be a tear-away end. As a tear-away end, the spool end 600 includes a line of weakness 604. In the subject embodiment, the line of weakness 604 extends from an inner diameter 606 of the spool end 600 to an outer diameter 608 of the spool end 600.

Figure 19:
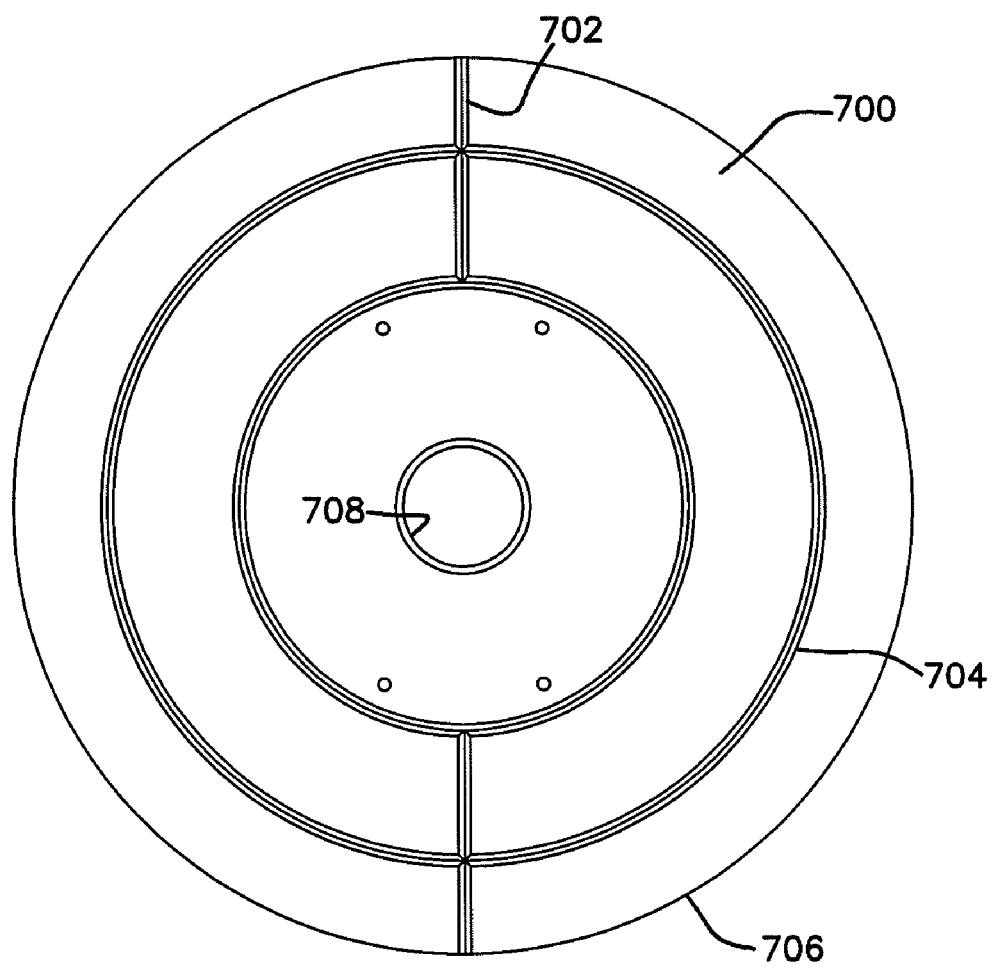
FIG. 19 is an alternate embodiment of a spool end suitable for use with the drop terminal of FIG. 13.

Referring now to FIG. 19, an alternate embodiment of a spool end 700 is shown. In the depicted embodiment of FIG. 19, the spool end 700 includes at least one radial area of weakness 702 and at least one circular area of weakness 704. The radial area of weakness extends from an outside diameter 706 radially inward toward an inner diameter 708 of the spool end 700. The circular area of weakness 704 forms a ring having a diameter that is less than the outer diameter 706 but greater than the inner diameter 708. In the subject embodiment, the circular area of weakness 704 is concentric with the outer diameter 706. In one embodiment, the radial and circular areas of weakness 702, 704 are perforated areas. In another embodiment, the radial and circular areas of weakness 702, 704 are areas of reduced thickness.

Referring again to FIG. 13, each of the spool ends 600 defines an access notch 610 that extends outwardly in a radial direction from the inner diameter 606 and a tab 612 that extends inwardly in a radial direction. The access notch 610 is adapted to provide access to cable wound around the drum portion 602 of the spool 44. The access notch 610 is also adapted to provide a location through which the F2 distribution cable 30 can pass to get access to the cable passage 530 in the housing 42 of the drop terminal 36. The tab 612 is adapted for engagement with the drum portion 602 in order to prevent rotation of the spool ends 600 relative to the drum portion 602.

The drum portion 602 is generally cylindrical in shape and includes a first axial end 614 and an oppositely disposed second axial end 616. In the subject embodiment, the first axial end 614 is disposed adjacent to a bracket 618 that is adapted to receive the housing 42 while the second axial end 616 is disposed adjacent to the mounting assembly 500. The drum portion further includes an inner bore 620 and an outer surface 622.

Each of the first and second axial ends 614, 616 defines a groove 624. In the subject embodiment, each groove 624 extends from the inner bore 620 through the outer surface 622 and is adapted to receive the tab 612 from one of the spool ends 600. As previously stated, the engagement of the tab 612 of spool end 600 in the groove 624 of the drum portion 602 prevents rotation of the spool end 600 relative to the drum portion 602.

The second axial end 616 further defines a notch 626. In the subject embodiment, the notch 626 extends from the inner bore 620 through the outer surface 622 and is disposed on the second axial end 616 opposite the groove 624 on the second axial end 616. The notch 626 is adapted to engage a protrusion 628 on a first plate 630 of the mounting assembly 500. The engagement of the notch 626 and the protrusion 628 of the first plate 630 of the mounting assembly 500 prevents relative rotation between the drum portion 602 and the first plate 630 of the mounting assembly 500.

The mounting assembly 500 includes the first plate 630 and a second plate 632. The first plate 630 is adapted for engagement with the spool 44 while the second plate 632 is adapted for engagement with a mounting location (e.g., hand hole 38, telephone pole 40, etc.). A bearing 634 is disposed between the first and second plates 630. In the subject embodiment, the bearing 634 is a simple bearing having a ring member 636, which is engaged with the second plate 632, and a puck 638, which is engaged with the first plate 630. The puck 638 is adapted for sliding rotational engagement with the ring member 636.

The bearing 634 and the engagement between the first plate 630, the spool 44, and the housing 42 of the drop terminal 36 allow the drop terminal 36 to rotate relative to the second plate 632. This engagement of the first plate 630, the spool 44 and the housing 42 allows the first end 31 of the F2 distribution cable 30 to be deployed from the spool 44 while the second end 33 is optically engaged within the interior of the housing 42.

Figure 20:
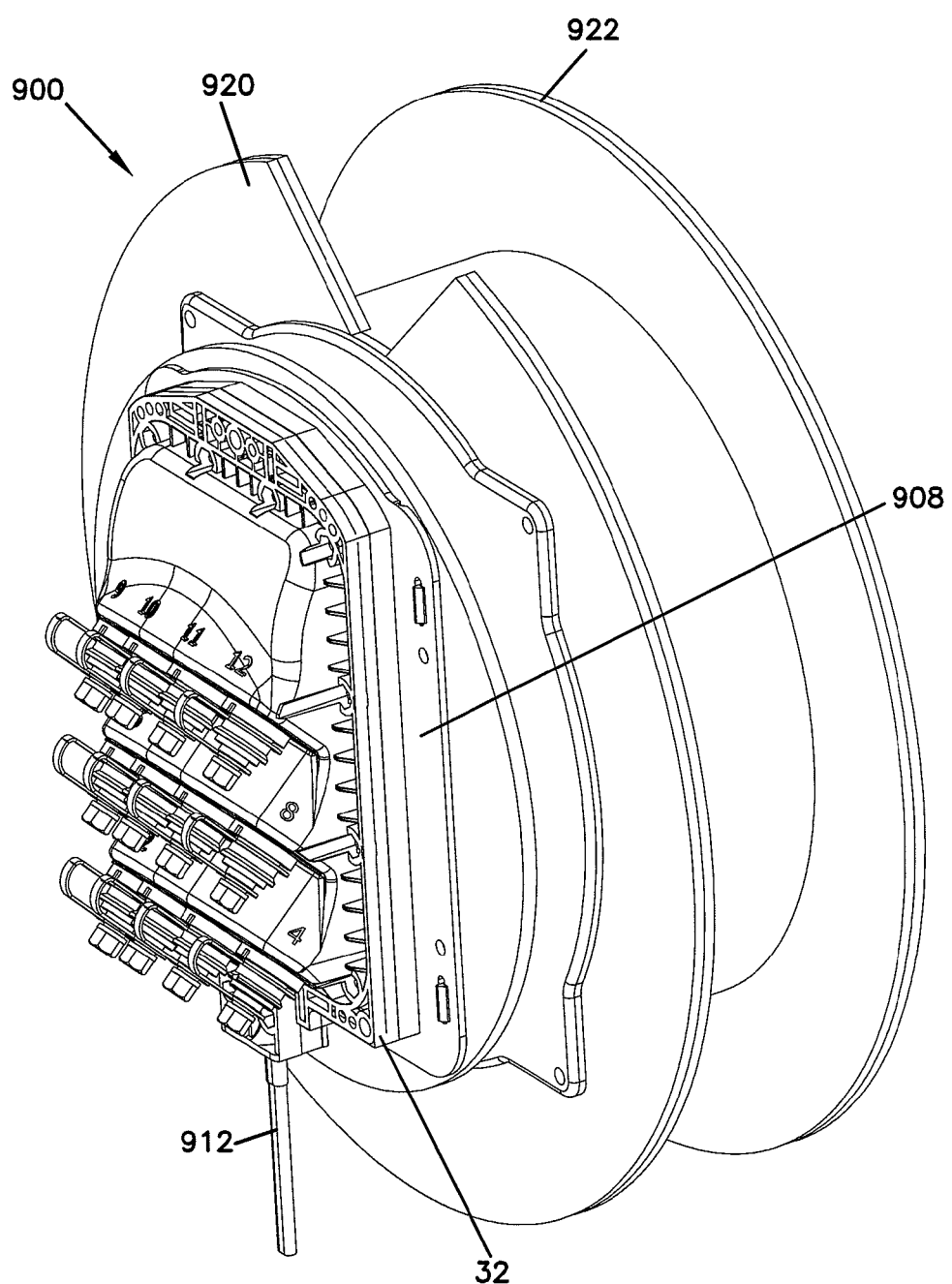
FIG. 20 is a perspective view of an alternate embodiment of a fiber spooling system in accordance with the principles of the present disclosure for use with a drop terminal.
Figure 21:
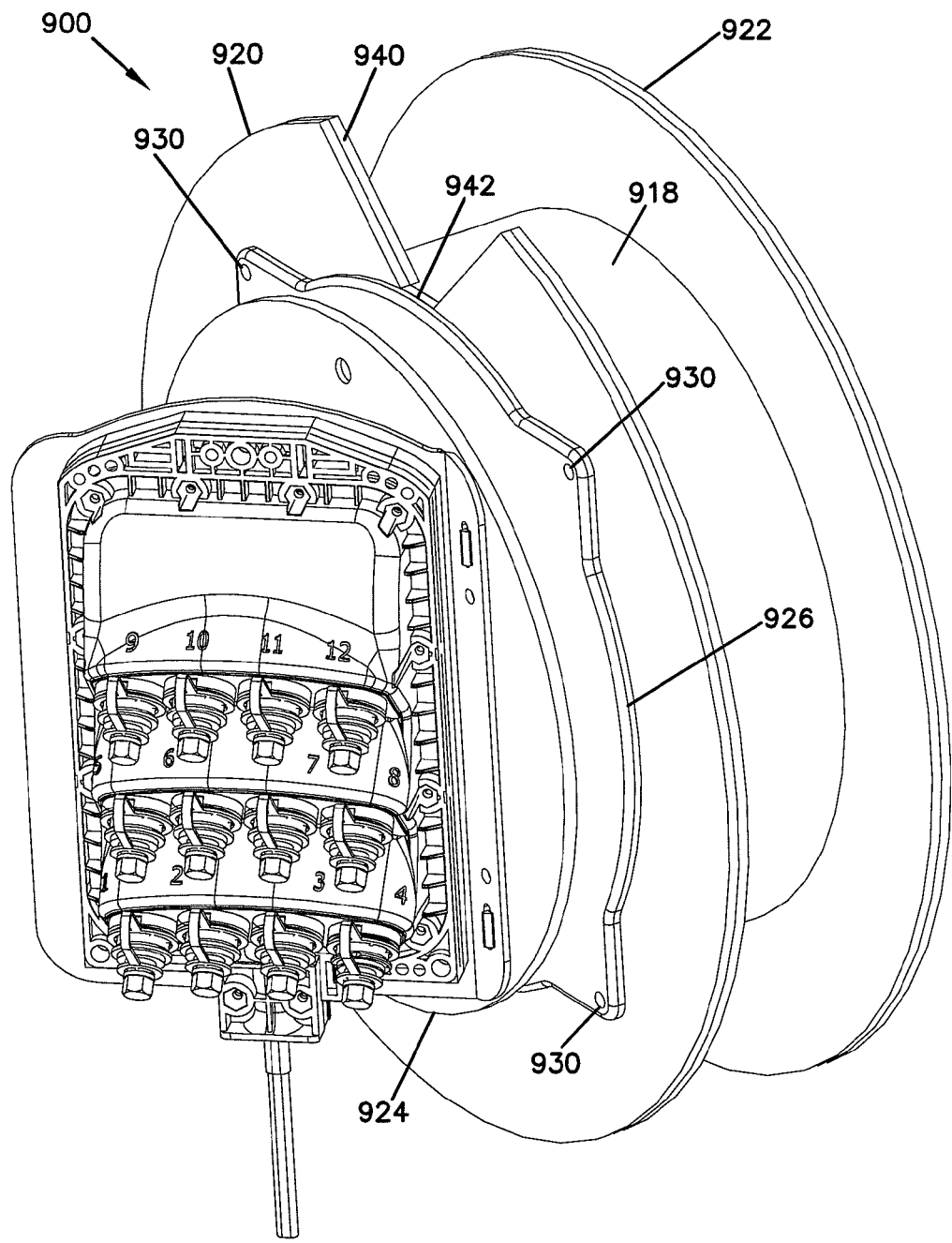
FIG. 21 is a perspective view of the fiber spooling system of FIG. 20 with a hinge plate in an open position.
Figure 22:
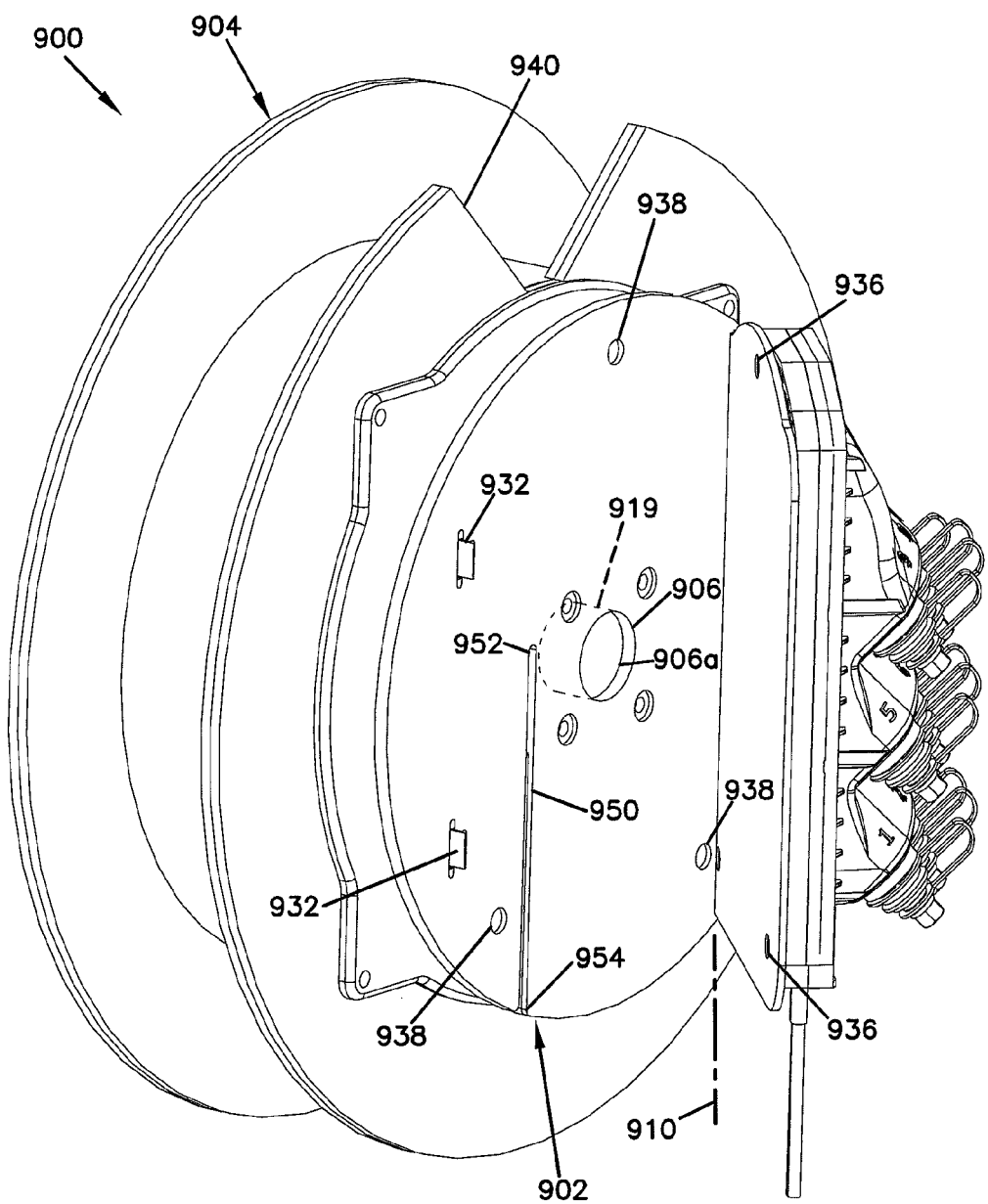
FIG. 22 is a perspective view of the fiber spooling system of FIG. 20 with the hinge plate in the open position.

FIGS. 20-22 show another fiber optic cable spooling system 900 in accordance with the principles of the present disclosure. The spooling system 900 is shown used in combination with drop terminal 36. The spooling system 900 includes a slack storage spool 902 mounted to a disposable bulk storage spool 904. A central passage 906 extends axially through both the bulk storage spool 904 and the slack storage spool 902. The central passage 906 is formed by a first opening 906a that extends coaxially through the slack storage spool 902 and a second opening (not shown) that extends through the bulk storage spool 904 in coaxial alignment with the first opening 906a. The spooling system 900 further includes a hinge plate 908 mounted to a front face of the slack storage spool 902. The hinge plate 908 is pivotally connected to the slack storage spool 902 by a hinge or other type of pivot structure that allows the hinge plate 908 to pivot relative to the slack storage spool 902 about a pivot axis 910 that is generally parallel to the front face of the slack storage spool 902. The drop terminal 36 mounts to a front face of the hinge plate 908. The hinge plate 908 allows the drop terminal 36 to be pivoted between a first position (see FIG. 20) and second position (see FIGS. 21 and 22). When the drop terminal 36 and the hinge plate 908 are in the first position, a front side of the drop terminal 36 faces outwardly from the front side of the slack storage spool 902 and a back side of the drop terminal 36 faces toward the front side of the slack storage spool 902. In this orientation, the hinge plate 908 and the drop terminal 36 block access to the central passage 906 from the front side of the spooling system 900. When the drop terminal 36 and the hinge plate 908 are in the second position, the hinge plate 908 and the drop terminal 36 are pivoted away from the front side of the slack storage spool 902 such that the central passage 906 can be access from the front side of the spooling system 900.

Prior to installation of the drop terminal 36 in the field, a distribution cable 912 corresponding to the drop terminal 36 is spooled around both the slack storage spool 902 and the bulk storage spool 904 to facilitate shipping and handling of the drop terminals 36 along with the corresponding distribution cable 912. A first portion of the distribution cable 912 is stored at the slack storage spool 902 while a second portion of the distribution cable 912 is stored about the bulk storage spool 704.

In use of the spooling system 900, the spooling system 900 and its corresponding drop terminal 36 can be delivered to a location in close proximity to where it is desired to mount the drop terminal 36. When shipping takes place, the hinge plate 908 and drop terminal 36 are oriented in the closed position. To begin the installation process, the hinge plate 908 is pivoted from the closed position of FIG. 20 to the open position of FIGS. 21 and 22. With the hinge plate 908 in the open position, a front end of the central passage 906 is exposed such that a mandrel can be inserted through the central passage 906. It will be appreciated that the mandrel may be supported on a cart, frame, or other structure so that the spooling system 900 is elevated above the ground. The distal end of the distribution cable 912 (i.e., the end of the distribution cable that is farthest from the drop terminal 36) can then be accessed and pulled towards a connection/termination location such as a fiber distribution hub. For example, the distal end of the distribution cable 912 could be pulled through an underground conduit or routed along an aerial routing path. As the distribution cable 912 is pulled, the second portion of the distribution cable 912 is removed from the bulk storage spool 904. As the second portion of the distribution cable 912 is removed from the bulk storage spool 904, the bulk storage spool 904, the slack storage spool 902, the hinge plate 908 and the drop terminal 36 all rotate together in unison about the mandrel as the cable pays off of the bulk storage spool 904. Once the second portion of the distribution cable 912 has been completely removed from the bulk storage spool 904, the first portion of the distribution cable 912 begins to pay off of the slack storage spool 902. The first portion of the distribution cable 912 continues to be paid off of the slack storage spool 902 until the distal end of the distribution cable 912 reaches its end destination (e.g., a fiber distribution hub, collector box or other termination location). Once a sufficient length of the distribution cable 912 has been removed from the spooling system 900, the spools 902, 904 can be removed from the mandrel, and the bulk storage spool 904 can be disconnected from the slack storage spool 902 and discarded. Extra length of the distribution cable 912 can remain stored on the slack storage spool 902. The hinge plate 908 can then be moved back to the closed position of FIG. 20, and the drop terminal 36 can be mounted to its desired mounting location by securing the slack storage spool 902 to the mounting location (e.g., a wall, a pole or other structure).

The spooling system 900 is preferably adapted to hold a relatively large amount of cable. For example, in one embodiment, the slack storage spool 902 holds about 60 meters of 5 mm diameter distribution cable, and the bulk spool 904 is sized to hold about 550 meters of 5 mm diameter distribution cable. In other embodiments, the spooling system 900 holds at least 200 meters of 5 millimeter diameter cable. In still other embodiments, the spooling system 900 is sized to hold at least 400 meters of 5 millimeter diameter cable. In additional embodiments, the spooling system 900 is configured to hold at least 600 meters of 5 millimeter diameter cable.

Referring to FIGS. 20-22, the bulk storage spool 904 has a diameter that is substantially larger than the diameter of the slack storage spool 902. The bulk storage spool 904 includes a core 918 about which the distribution cable is wrapped during storage. The bulk storage spool 904 also includes front and back radial flanges 920, 922 positioned at front and back axial ends of the core 918. The flanges 920, 922 are spaced-apart in a direction extending along the axis of the core 918 so as to define a cable storage space between the flanges 920, 922 which surrounds the core 918. The central passage 906 extends axially through a center of the core 918. During use of the bulk storage spool 904, the second portion of the distribution cable 912 is wrapped around the core 918 and is contained in the region between the front and back flanges 920, 922.

The slack storage spool includes a core 919 that is coaxially aligned with the core 918 of the bulk storage spool 904. The core 919 has a diameter that is substantially smaller than the diameter of the core 918 and the passage 906 extends axially through a center of the core 919. The slack storage spool 902 also includes front and back radial flanges 924, 926 positioned at front and back axial ends of the core 919. The flanges 924, 926 are spaced-apart in a direction extending along the axis of the core 919 so as to define a cable storage space between the flanges 924, 926 which surrounds the core 919. The flanges 924, 926 have smaller diameters than the flanges 920, 922. During use of the slack storage spool 902, the first portion of the distribution cable 912 is wrapped around the core 919 and is contained in the region between the front and back flanges 924, 926.

The slack storage spool 902 is preferably non-rotatably mounted to the bulk storage spool 904. By "non-rotatably" mounted, it is meant that the slack storage spool 902 is mounted in such a way that the slack storage spool 902 and the bulk storage spool 904 can rotate in unison about a mandrel through the central passage 906 when cable is dispensed from the spooling system 900. In one embodiment, the slack storage spool 902 can be secured to a front face of the front flange 920 of the bulk storage spool 904 by fasteners (e.g., bolts, screws, rivets, pins, snaps, etc.) inserted through fastener openings 930 defined through the rear flange 926 of the slack storage spool 902. Preferably, the fasteners are removable so that the slack storage spool 902 can be disconnected from the bulk storage spool 904 after the second portion distribution cable 912 has been removed from the bulk storage spool 904. After the bulk storage spool 904 has been disconnected from the slack storage spool 902, the mounting openings 930 can be used to receive fasteners for securing the slack storage spool 902 to the structure (e.g., a wall or pole) to which it is desired to mount the drop terminal 36.

Referring to FIG. 22, the front face of the front flange 924 of the slack storage spool 902 includes a pair of flexible latches 932 that engage the hinge plate 908 when the hinge plate 908 is in the closed position to selectively hold the hinge plate 908 in the closed position.

The drop terminal 36 can be secured to the hinge plate 908 by fasteners inserted through openings defined through the housing 42 of the drop terminal 36 that coaxially align with corresponding opening 936 provided through the hinge plate 908. After the distribution cable 912 has been dispensed from the spooling system 900 and the hinge plate 908 has been pivoted back to the closed position, the openings 936 can be aligned with corresponding opening 938 provided in the front flange 924 of the slack storage spool 902, and the fasteners used to secure the drop terminal 36 to the hinge plate 908 can be removed and replaced with longer fasteners that extend through the openings defined by the housing 42 of the drop terminal 36, the openings 936 defined by the hinge plate 908 and the openings 938 defined through the front flange 924 of the slack storage spool 902. In this manner, the fasteners provide retention of the drop terminal 36 to the slack storage spool 902 that supplements the retention force provided by the clip 932.

The front flange 920 of the bulk storage spool 904 defines a cable transition notch 940 having a bottom end 942 that is generally flush with an outer circumferential surface of the core 918 and is also generally flush with the outer peripheral surface of the rear flange 926 of the slack storage spool 902. Similarly, the slack storage spool 902 includes a cable transition slot 950 having a closed end 952 that is generally flush with the outer circumferential surface of the core 919 of the slack storage spool 902. The slot 950 also includes an open end 954 located at an outer peripheral edge of the front flange 924 of the slack storage spool 902. When spooling the distribution cable 912 on the spooling system 900, the distribution cable 912 is routed from the bottom end of the drop terminal 36 through the cable transition slot 950 to the core 919. The first portion of the distribution cable 912 is then wrapped around the core 919 until the space between the flanges 924, 926 is filled and the cable reaches the outer peripheral edges of the flanges 924, 926. The cable is then passed through the cable transition notch 940 to the outer circumferential surface of the core 918 of the bulk storage spool 904. The second portion of the distribution cable 912 is then wrapped around the core 918 to complete the storage of the remainder of the distribution cable 912.

In an alternative installation process, the spooling system 900 and the corresponding drop terminal 36 can initially be delivered to a termination location (e.g., a fiber distribution hub, collector box or other structure) that is remote from the desired mounting location of the drop terminal 36. The distal end of the distribution cable is then connected to the termination location. Thereafter, the hinge plate 908 is pivoted to the open position of FIGS. 21 and 22, and a mandrel mounted to a moveable structure such as a moveable cart is passed through the central opening 906. Thereafter, the cart is used to move the spooling system 900 and its corresponding drop terminal 36 to the desired mounting location. As the cart is moved, the slack storage spool 902, the bulk spool 904 and the drop terminal 36 rotate in unison as the distribution cable 912 is paid off the spooling system. Before reaching the end destination, it is preferred for all of the second portion of the distribution cable 912 to be removed from the bulk storage spool 904. Thus, when the final destination is reached, the bulk spool 904 can be removed from the slack storage spool 902 and discarded. Thereafter, the slack storage spool 902 can be mounted to a desired mounting location to secure the drop terminal at the desired location.

Figure 23:
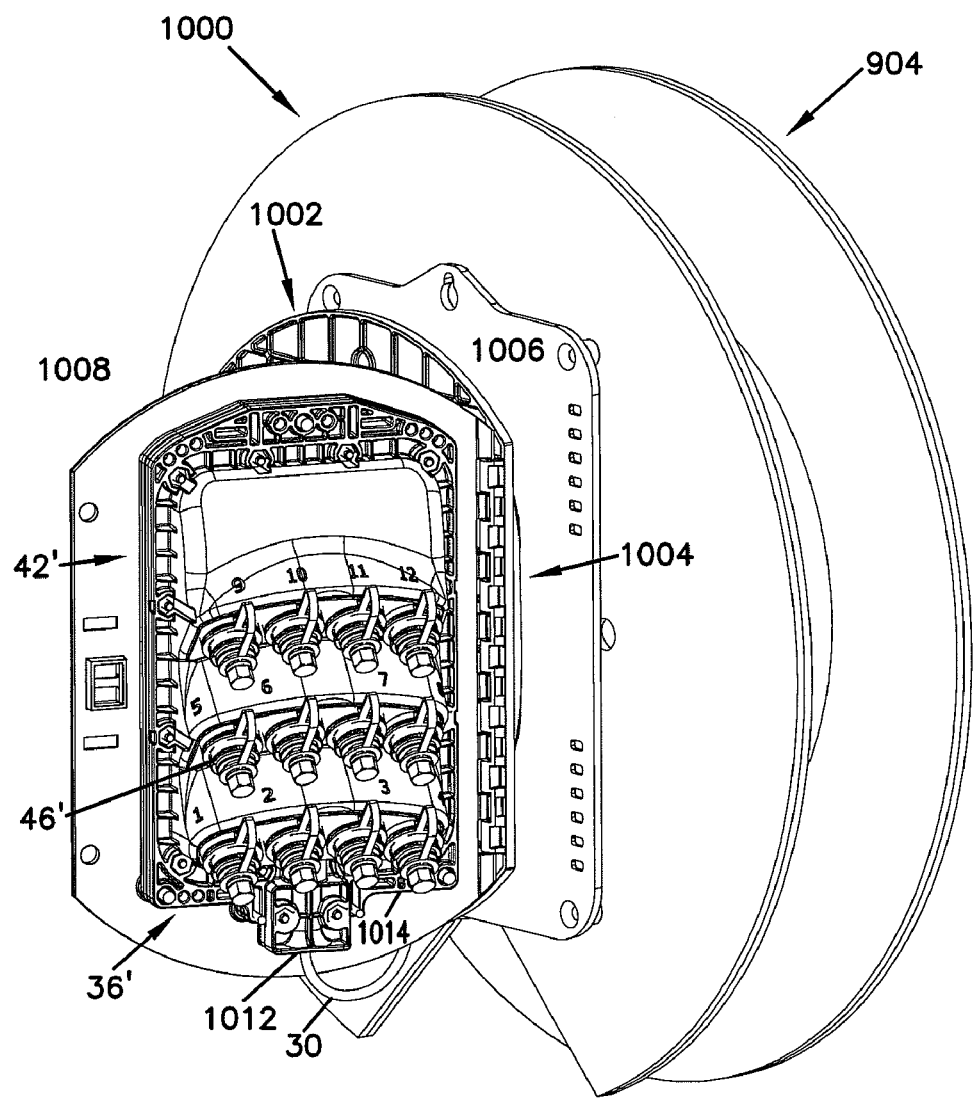
FIG. 23 is a perspective view of an alternate embodiment of a spooling system.
Figure 24:
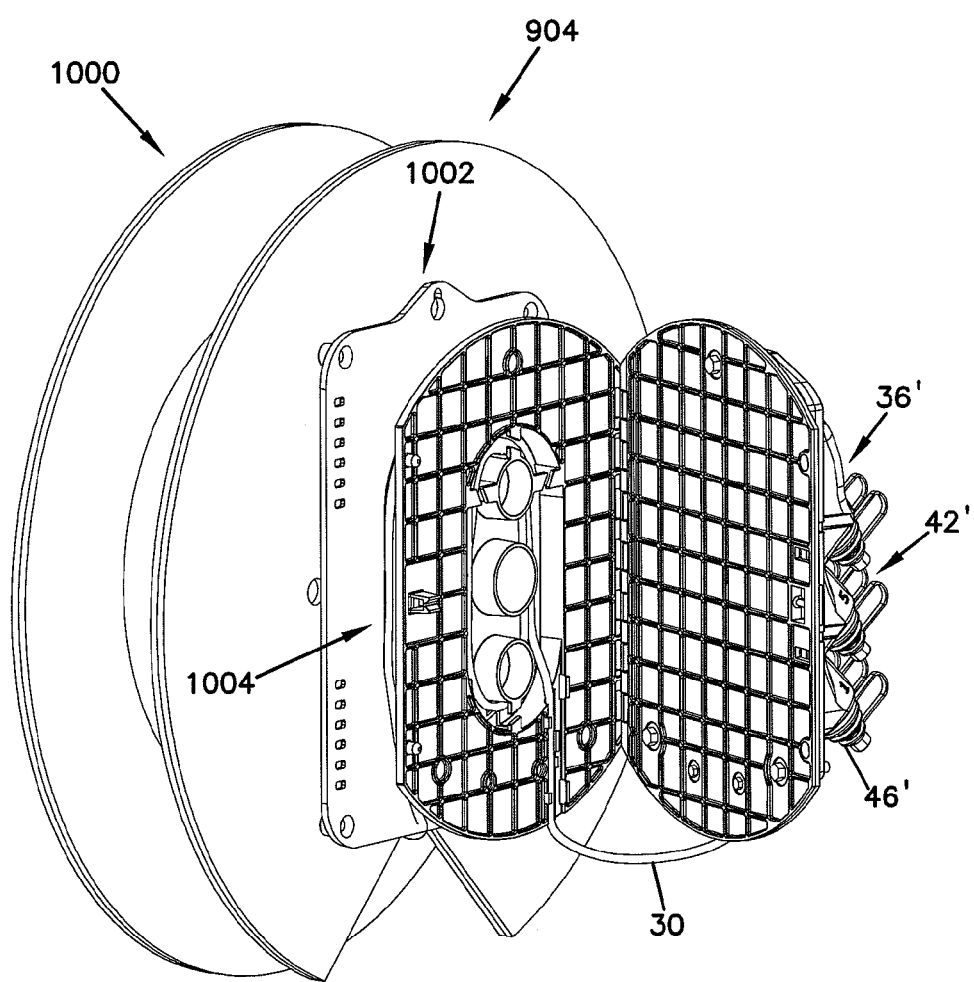
FIG. 24 is a perspective view of the spooling system with a hinge plate in an open position.
Figure 25:
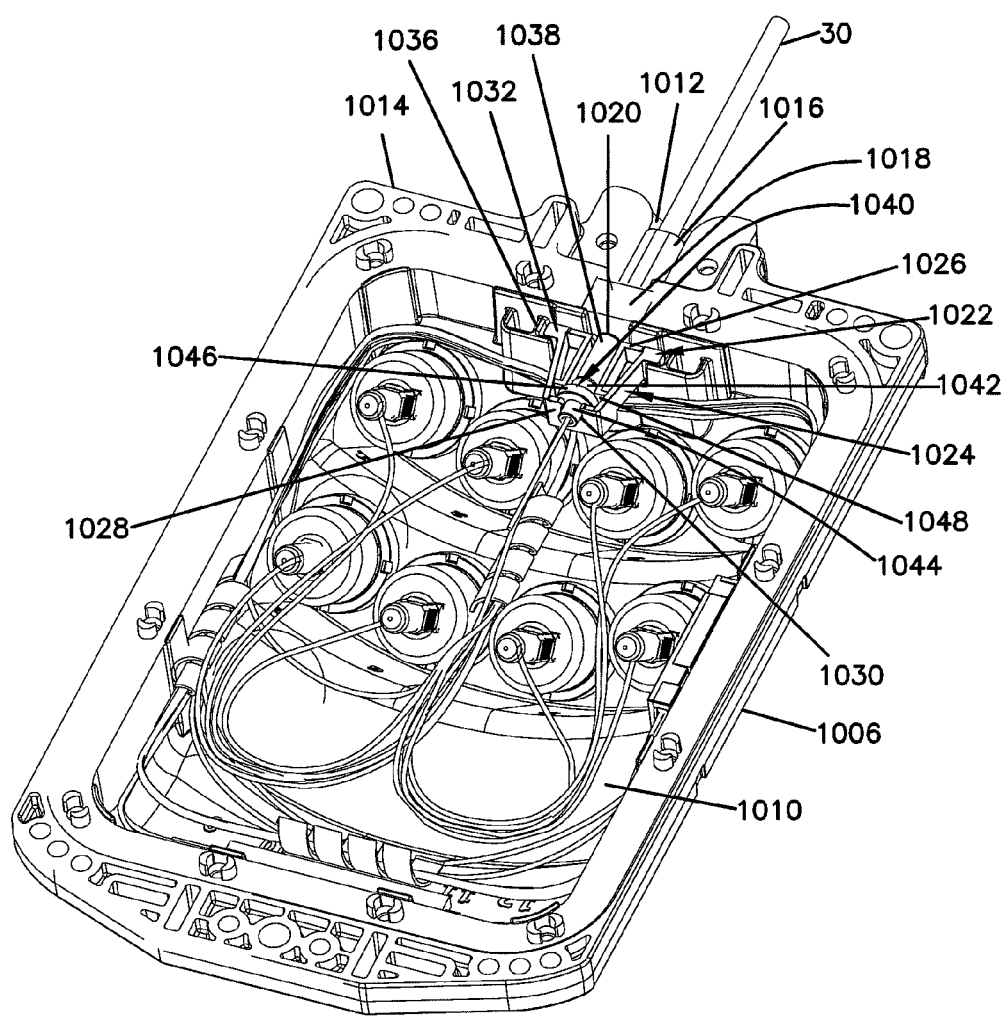
FIG. 25 is a perspective view of a cover of a drop terminal of the spooling system of FIG. 23.
Figure 26:
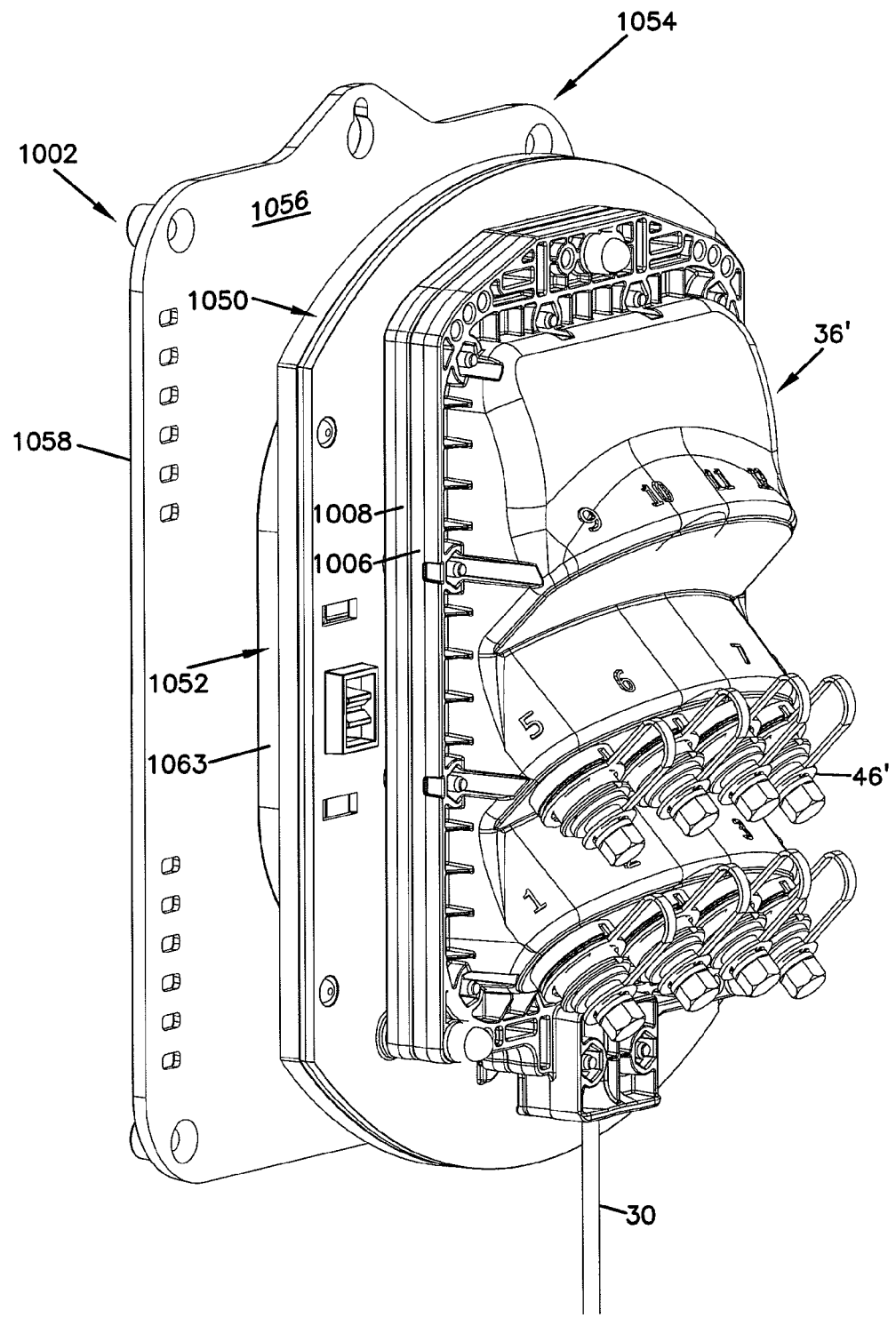
FIG. 26 is a perspective view of a drop terminal assembly suitable for use with the spooling system of FIG. 23.

Referring now to FIGS. 23-25, an alternate embodiment of a spooling system 1000 is shown. The spooling system 1000 includes a drop terminal assembly 1002 having a drop terminal 36' that is selectively releasably engaged with a slack storage spool 1004 that is selectively releasably engaged with the bulk storage spool 904.

The drop terminal 36' includes a housing 42'. The housing 42' includes a cover 1006 and a base 1008. In the subject embodiment, the cover 1006 and the base 1008 cooperatively define an interior region 1010. A plurality of ruggedized fiber optic adapters 46' is mounted to the housing 42'. In the subject embodiment, the plurality of ruggedized fiber optic adapters 46' is mounted to the cover 1006.

The ruggedized fiber optic adapters 46' include first ports that are accessible from outside the housing 42' and second ports that are accessible from inside the housing 42'. The first ports of the ruggedized fiber optic adapters 46' are adapted to receive connectorized ends of distribution cables. The second ports of the ruggedized fiber optic adapters 46' are adapted to receive fibers of the multi-fiber distribution cable 30.

The housing 42' defines an access opening 1012. In one embodiment, the access opening 1012 is cooperatively defined by the cover 1006 and the base 1008. In the subject embodiment, the access opening 1012 is disposed in a sidewall 1014 of the housing 42'. The multi-fiber cable 30 is routed into the interior of the housing 42' through the access opening 1012.

In the subject embodiment, the housing 42' includes a first environmental seal 1016 and a second environmental seal 1018. The first and second environmental seals 1016, 1018 are disposed in the access opening 1012. In the subject embodiment, the first environmental seal 1016 is a grommet. The first environmental seal 1016 is adapted to sealingly engage the multi-fiber cable 30. The second environmental seal 1018 includes a passage 1020 through which the multi-fiber cable 30 passes. The second environmental seal 1018 is adapted to seal around the multi-fiber cable 30.

The housing 42' further includes an anchor block 1022. The anchor block 122 is disposed in the interior region 1010 of the housing 42'. In the subject embodiment, the anchor block 1022 is disposed immediately adjacent to the access opening 1012 of the drop terminal 36'.

The anchor block 1022 includes a body 1024 having a first end 1026 and a second end 1028. The anchor block 1022 defines a passage 1030 that extends through the first and second ends 1026, 1028. The passage 1030 is adapted to receive a portion of the multi-fiber cable 30.

The anchor block 1022 is engaged with the housing 42'. In the subject embodiment, the anchor block 1022 is in interlocking engagement with the housing 42'. The anchor block 1022 includes a plurality of tabs 1032 that extend outwardly from the anchor block 1022. In the subject embodiment, the plurality of tabs 1032 extends outwardly from the body 1024 of the anchor block 1022 in a direction that is generally perpendicular to a central longitudinal axis of the anchor block 1022. The plurality of tabs 1032 is adapted to engage a first receptacle 1036 in the housing 42' of the drop terminal 36'.

The anchor block 1022 includes a crimp 1038 and a retainer 1040 disposed in the passage 1030. In the subject embodiment, the crimp 1038 is a cylindrical tube that is made of a deformable material. The crimp 1038 defines a thru-bore that is adapted to receive the multi-fiber cable 30. With the multi-fiber cable 30 disposed in the thru-bore of the crimp 1038, the crimp 1038 can be deformed around the multi-fiber cable 30 by compressing the crimp 1038.

The retainer 1040 includes a first end portion 1042, a second end portion 1044 and a flange 1046 disposed between the first and second end portions 1042, 1044. The retainer 1040 defines a bore that extends though the first and second end portions 1042, 1044. The bore is adapted to receive the multi-fiber cable 30.

The retainer 1040 is adapted to interlock with the anchor block 1022. In the subject embodiment, the flange 1046 of the retainer 1040 is adapted to be received in a second receptacle 1048 defined by the first end 1026 of the anchor block 1022. The engagement of the flange 1046 and the second receptacle 1048 axially retains the retainer 1040 in the anchor block 1022.

Referring now to FIGS. 26-29, the drop terminal 36' and the slack storage spool 1004 are shown in engagement. The slack storage spool 1004 includes a first flange 1050, a drum portion 1052 and a second flange 1054.

The second flange 1054 is adapted for engagement with the front radial flange 920 of the bulk storage spool 904. In the subject embodiment, a plurality of fasteners 1055 (e.g., bolts, screws, rivets, etc.) is used to engage the second flange 1054 to the front radial flange 920 of the bulk storage spool 904.

The second flange 1054 includes a first surface 1056 and an oppositely disposed second surface 1058. The first surface 1056 faces in a direction toward the drum portion 1052 while the second surface 1058 faces in a direction toward the bulk cable spool 904. The second surface 1058 includes a mounting area 1060. The mounting area 1060 extends outwardly from the second surface 1058. The mounting area 1060 adapted for mounting the slack storage spool 1004 and the drop terminal 36' to a mounting location (e.g., wall, pole, post, hand hole, etc.). In the subject embodiment, the mounting area 1060 defines a channel 1062. In the subject embodiment, the channel 1062 is arcuate in shape. The channel 1062 is adapted to receive a portion of a mounting structure (e.g., a post, pole, etc.).

The drum portion 1052 is disposed between the first flange 1050 and the second flange 1054. In the subject embodiment, the drum portion 1052 is releasably engaged to the first flange 1050. The releasable engagement is potentially advantageous as it allows the drum portion 1052 and the second flange 1054 to be removed from the drop terminal 36' in the event all of the cable 30 is unwound from the bulk storage spool 904 and the slack storage spool 1004. In one embodiment, the drum portion 1052 is in snap-fit engagement with the first flange 1050. In another embodiment, the drum portion 1052 is engaged with the first flange 1050 by fasteners 1061 (e.g., bolts, screws, etc.).

The drum portion 1052 includes an outer surface 1063 (shown in FIG. 26) and defines an inner cavity. The drum portion 1052 is configured to receive the multi-fiber cable 30 such that the multi-fiber cable 30 wraps around the outer surface 1063 of the drum portion 1052. In the subject embodiment, the drum portion 1052 is cylindrical in shape having a cross-section that is generally oblong. In another embodiment, the drum portion 1052 has a cross-section that is generally oval in shape.

The first flange 1050 includes a flange plate 1065 and a hinge plate 1066. The first flange 1050 further includes a hinge assembly 1068.

Figure 27:
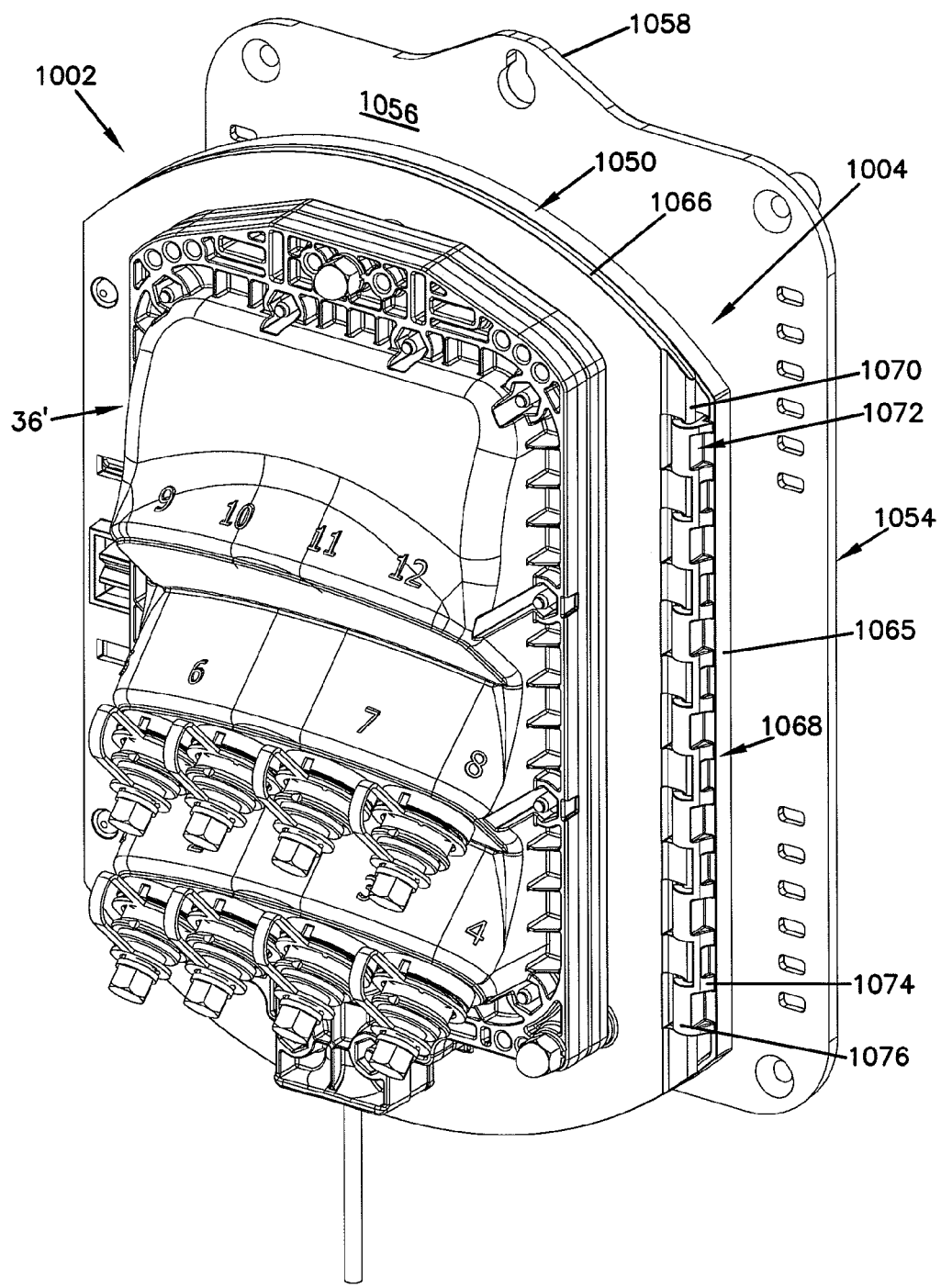
FIG. 27 is a perspective view of the drop terminal assembly of FIG. 26.

Referring now to FIG. 27, the hinge assembly 1068 includes a hinge pin 1070 and a hinge receptacle 1072. The hinge receptacle 1072 is adapted to receive the hinge pin 1070. In the subject embodiment, the hinge pin 1070 is engaged to the hinge plate 1066 while the hinge receptacle 1072 is fixed to the flange plate 1065. In the subject embodiment, the hinge receptacle 1072 includes a base end 1074 that is fixed to the flange plate 1065 and a free end 1076 that extends outwardly from the flange plate 1065. In one embodiment, the free end 1076 of the hinge receptacle 1072 is generally hook-shaped.

The hinge assembly 1068 is adapted to allow the hinge plate 1066 to pivot relative to the flange plate 1065 between a first position (shown in FIG. 27) and a second position (shown in FIG. 28) relative to the flange plate 1065. In one embodiment, the hinge plate 1066 pivots in a range of about 0 degrees to about 180 degrees. In another embodiment, the hinge plate 1066 pivots in a range of about 0 degrees to about 90 degrees. In another embodiment, the hinge plate 1066 pivots an amount greater than or equal to 45 degrees.

Figure 28:
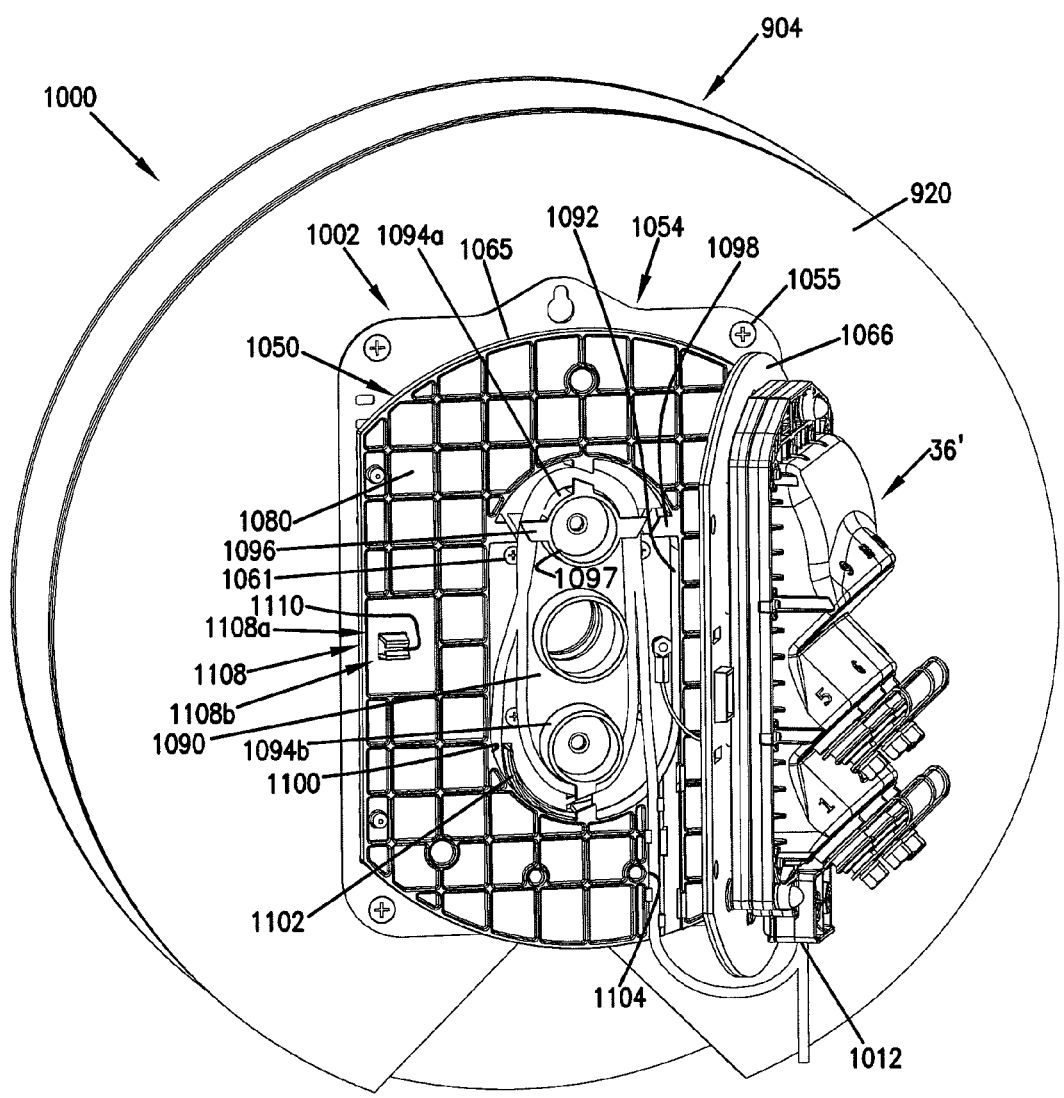
FIG. 28 is a perspective view of the spooling system of FIG. 23.
Figure 29:
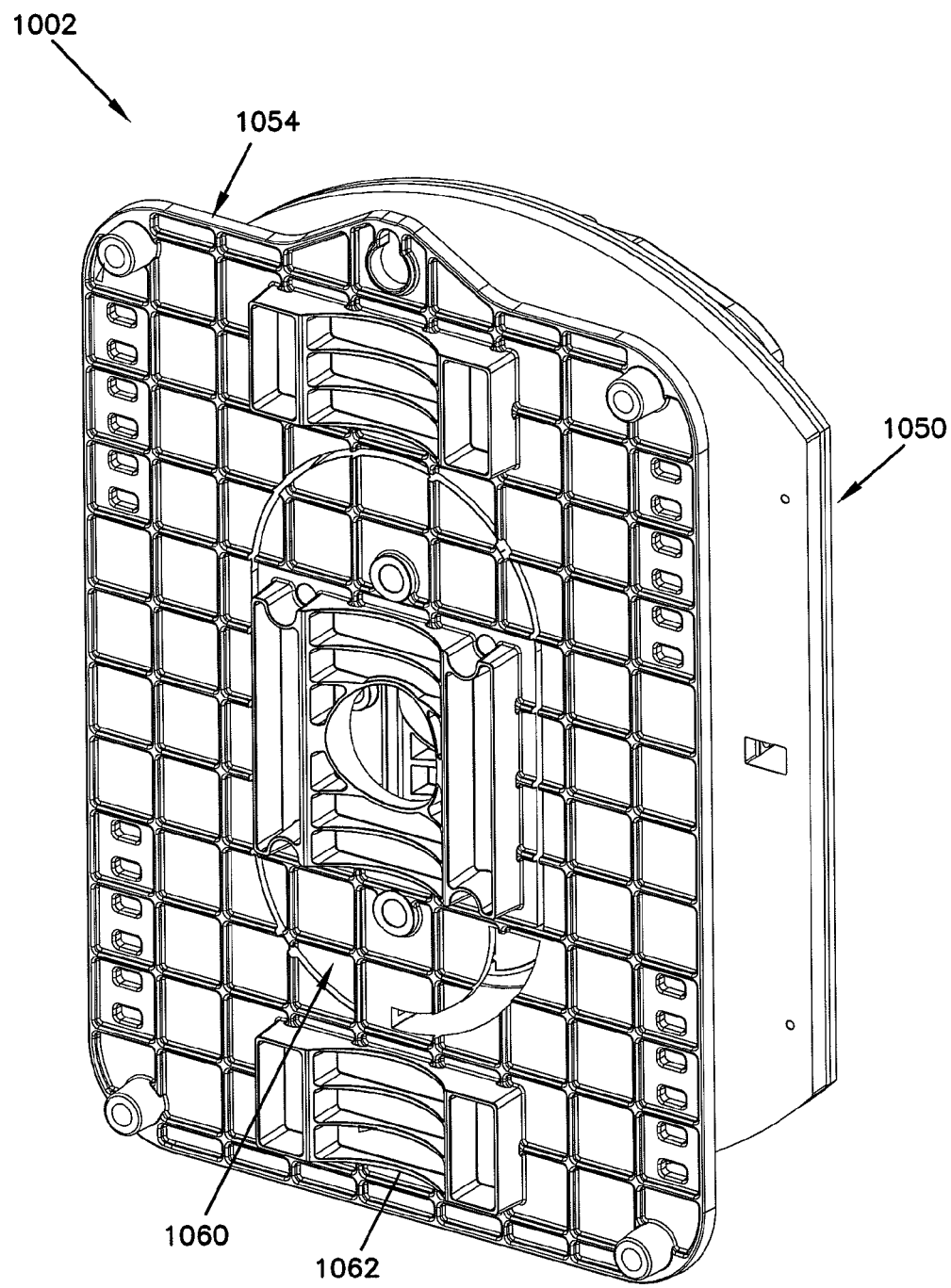
FIG. 29 is a rear perspective view of the drop terminal assembly of FIG. 26.
Figure 30:
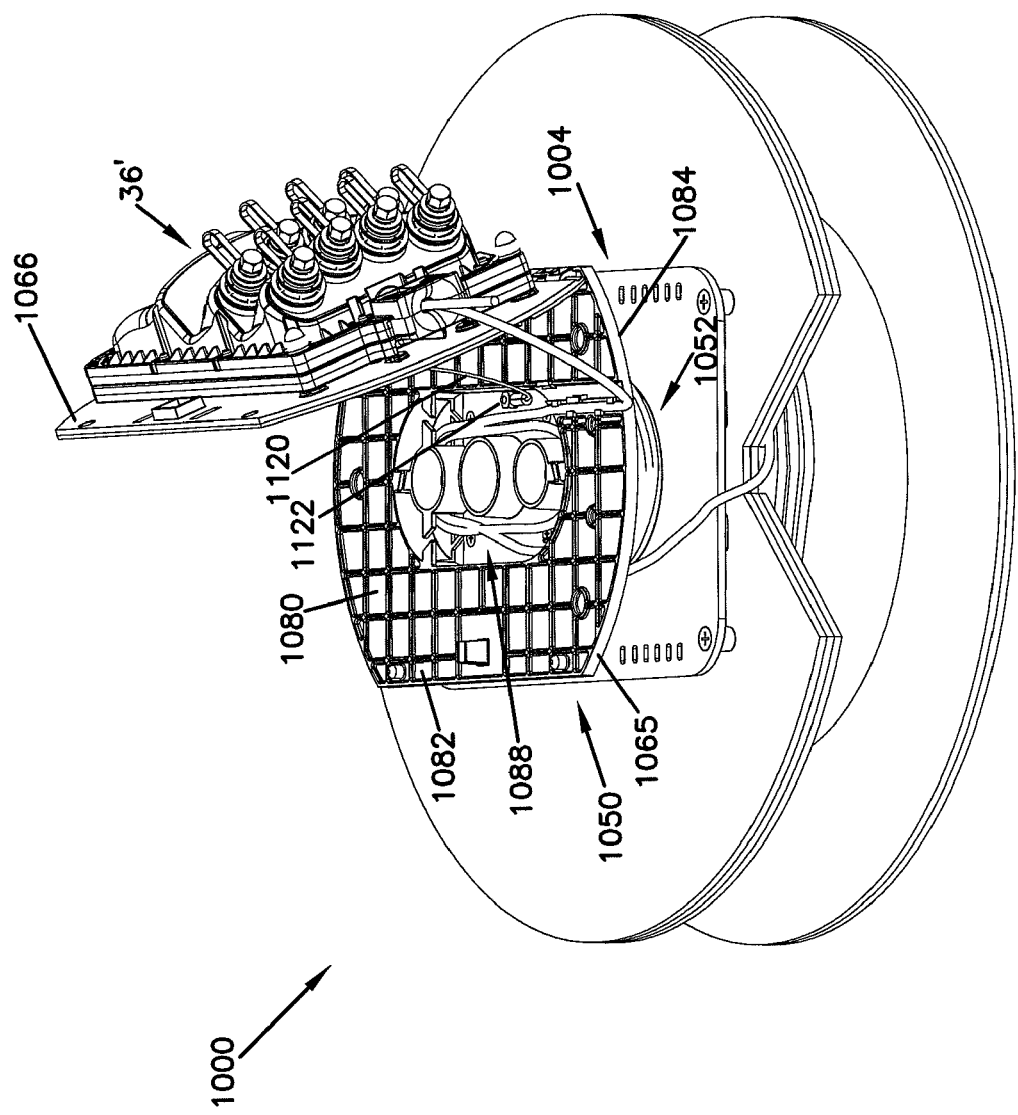
FIG. 30 is a perspective view of the spooling system of FIG. 23.
Figure 31:
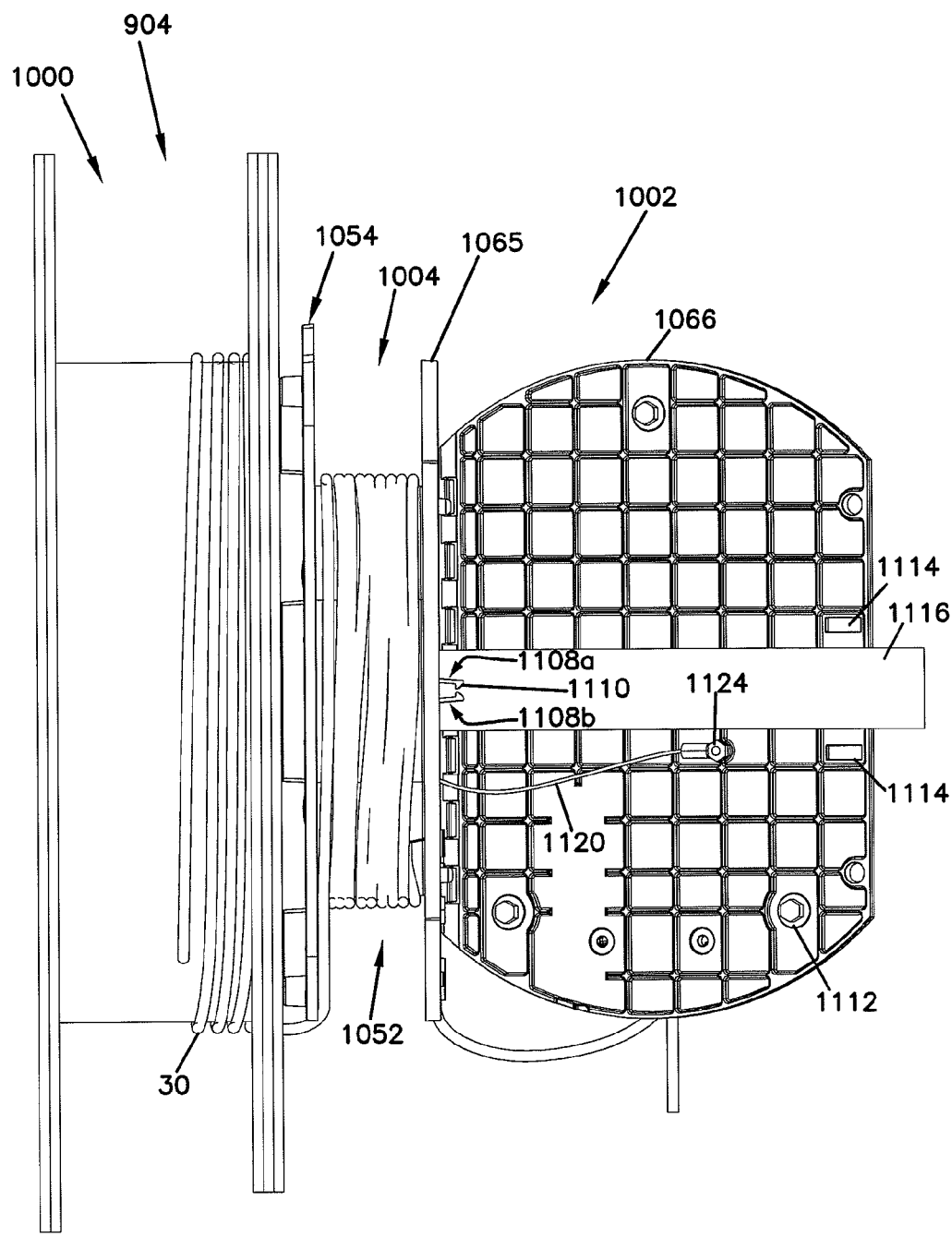
FIG. 31 is a side view of the spooling system of FIG. 23 with a mandrel.

Referring now to FIGS. 28, 30 and 31, the flange plate 1065 includes a base wall 1080 having a first surface 1082 and an oppositely disposed second surface 1084. The first surface 1082 faces toward the drop terminal 36' when the hinge plate 1066 is in the first position relative to the flange plate 1065. The second surface 1084 faces toward the drum portion 1052 of the slack storage spool 1004.

The flange plate 1065 further includes a cable management area 1088. In the subject embodiment, the cable management area 1088 is a recessed area. The cable management area 1088 includes a base 1090 that is axially offset from the base wall 1080 of the flange plate 1065 and a sidewall 1092 that extends between the base 1090 of the cable management area 1088 and the base wall 1080 of the flange plate 1065. The cable management area 1088 is adapted to be received in the inner cavity 1064 of the drum portion 1052.

The cable management area 1088 includes a first cable management spool 1094a and a second cable management spool 1094b. The first and second cable management spools 1094a, 1094b are offset from a central axis that extends axially through the center of the slack storage spool 1004.

In the subject embodiment, each of the first and second cable management spools 1094a, 1094b includes at least one cable retention projection 1096 that extends outwardly from an end 1097 of the first and second cable management spool 1094a, 1094b. In the subject embodiment, the cable retention projection 1096 extends outwardly from the cable management spool 1094 in a radial direction. The cable retention projection 1096 is aligned with a retention projection 1098 that extends inwardly from the sidewall 1092. A gap 1099 is disposed between an end of the cable retention projection 1096 and an end of the retention projection 1098 of the sidewall 1092 so that the multi-fiber cable 30 can be inserted in to the space between the cable management spool 1094 and the sidewall 1092.

The cable management area 1088 provides an additional location at which a portion of the multi-fiber cable 30 can be stored. Storage at this location is potentially advantageous during manufacturing as it allows for a length of cable to be stored prior to installation in the drop terminal 36'. In addition, the cable management area 1088 may provide a strain relief function. For example, as the spooling system 1000 is rotating during cable payout, the cable management area 1088 will reduce the risk of a tensile force being applied to the multi-fiber cable 30 at the access opening 1012 of the drop terminal 36' if all of the cable 30 is unwound from the bulk cable spool 904 and the slack storage spool 1004.

The sidewall 1092 of the cable management area 1088 defines a cable opening 1100 through which the multi-fiber cable 30 is routed to the cable management area 1088 from the drum portion 1052. In the subject embodiment, the cable opening 1100 is adapted to receive a transition portion 1102 disposed on an axial end, which is nearest the first flange 1050, of the drum portion 1052. The transition portion 1102 extends through the cable opening 1100 and into the cable management area 1088.

The base wall 1080 of the flange plate 1065 defines a cable channel 1104. The cable channel 1104 extends from the cable management area 1088 to an outer edge 1106 of the flange plate 1065. The cable channel 1104 is adapted to receive the multi-fiber cable 30 as the multi-fiber cable 30 is routed from the cable management area 1088 to the access opening 1012 of the drop terminal 36'.

The base wall 1080 includes a latch 1108. In the subject embodiment, the latch 1108 is a resilient latch that is adapted to engage a catch on the hinge plate 1066. In the subject embodiment, the latch 1108 includes a first resilient latch 1108a and a second resilient latch 1108b. Each of the first and second resilient latches 1108a, 1108b includes a protrusion 1110. In the subject embodiment, the protrusion 1110 of the first resilient latch 1108a faces the protrusion of the second resilient latch 1108b. Each protrusion 1110 engages the catch on the hinge plate 1066. The latch 1108 can be disengaged by moving the protrusion 1110 of the first resilient latch 1108a in a direction away from the protrusion 1110 of the second resilient latch 1108b.

Referring now to FIG. 31, the hinge plate 1066 includes a plurality of mounts 1112 at which the drop terminal 36' is mounted to the hinge plate 1066. In the depicted embodiment of FIG. 34, the hinge plate 1066 further includes a plurality of cable tie openings 1114. The cable tie openings 1114 extend through the hinge plate 1066 and are disposed adjacent to the catch. The cable tie openings 1114 are adapted to receive a cable tie that can be tied around a mandrel 1116. In the subject embodiment, the mandrel 1116 is a cylindrical bar that extends through a central opening that extends through the flange plate 1065, the drum portion 1052, the second flange 1054 and the bulk storage spool 904. In one embodiment, the mandrel 1116 can be held at opposite ends allowing the spooling system 1000 to rotate about the mandrel 1116 as multi-fiber cable 30 is paid out. The cable tie prevents the drop terminal 36' and the hinge plate 1066 from striking the mandrel 1116 as the spooling system 1000 rotates.

The second flange 1054 further includes a tether 1120. The tether 1120 includes a first end portion 1122 and an oppositely disposed second end portion 1124. The first end portion 1122 is engaged with the flange plate 1065 while the second end portion 1124 is engaged with the hinge plate 1066. The tether 1120 is adapted to prevent the hinge plate 1066 from opening beyond the second position.

In one embodiment, the hinge plate 1066 includes a mounting area similar to the mounting area 1060 on the second flange 1054. If the cable 30 is completely paid out from the bulk storage spool 904 and the slack storage spool 1004, the bulk storage spool 904, the second flange 1054, the drum portion 1052 and the flange plate 1065 can be removed from the spooling system 1000 such that the hinge plate 1066 and the drop terminal 36' can be directly mounted to a mounting structure.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A fiber optic drop terminal assembly comprising:
   a housing having a first exterior surface and an oppositely disposed second exterior surface;
   a plurality of ruggedized adapters mounted on the first exterior surface of the housing, wherein the ruggedized adapters include a first port accessible from outside the housing and a second port accessible from inside the housing;
   a spool engaged with the second exterior surface, the spool including a drum portion; and
   a fiber optic distribution cable coiled around the drum portion, the distribution cable having a first end and an oppositely disposed second end, wherein the second end is disposed inside the housing;
   wherein the housing and the spool rotate in unison to dispense the fiber optic distribution cable from the spool.

2. The fiber optic drop terminal assembly of claim 1, wherein the housing includes a front piece and a back piece.

3. The fiber optic drop terminal assembly of claim 2, further comprising a sealing member disposed between the front and back pieces of the housing.

4. The fiber optic drop terminal assembly of claim 1, wherein the plurality of ruggedized adapters are mounted at an oblique angle relative to a plane that extends through a central longitudinal axis of the housing and across a width of the housing.

5. The fiber optic drop terminal assembly of claim 1, further comprising a bulk storage spool mounted to the spool opposite the housing, wherein the bulk storage spool is removable.

6. The fiber optic drop terminal assembly of claim 1, wherein the drum portion of the spool around which the fiber optic distribution cable is coiled is generally cylindrical in shape with an oblong cross-section.

7. The fiber optic drop terminal assembly of claim 1, further comprising a hinge plate, the hinge plate having a front face to which the second exterior surface of the housing is mounted, wherein the hinge plate is pivotally connected to the spool.

8. The fiber optic drop terminal assembly of claim 5, wherein the bulk storage spool has a diameter that is substantially larger than a diameter of the spool.

9. The fiber optic drop terminal assembly of claim 5, wherein the spool and the bulk storage spool rotate in unison when the fiber optic distribution cable is dispensed from the fiber optic drop terminal assembly.

10. The fiber optic drop terminal assembly of claim 5, wherein a central passage extends axially through both the bulk storage spool and the spool, the central passage being configured to receive a mandrel about which the housing, the spool, and the bulk storage spool rotate in unison.

11. The fiber optic drop terminal assembly of claim 5, wherein the spool includes a core and first and second radial flanges that are axially spaced apart along the core; and wherein the bulk storage spool includes a core and first and second radial flanges that are axially spaced apart along the core of the second spool, the first flange of the bulk storage spool being secured to the second flange of the spool.

12. The fiber optic drop terminal assembly of claim 11, wherein the first flange of the bulk storage spool defines a cable transition notch through which the fiber optic distribution cable extends between the spool and the bulk storage spool.

13. The fiber optic drop terminal assembly of claim 12, wherein a bottom end of the cable transition notch is generally flush with an outer circumferential surface of the core of the bulk storage spool.

14. The fiber optic drop terminal assembly of claim 1, wherein the spool is a first storage spool and wherein the fiber optic drop terminal assembly further comprises a second storage spool mounted to the first storage spool opposite the housing.

15. The fiber optic drop terminal assembly of claim 14, wherein the first storage spool and the second storage spool rotate in unison when the fiber optic distribution cable is dispensed from the fiber optic drop terminal assembly.

16. The fiber optic drop terminal assembly of claim 14, wherein the second storage spool is removable.

17. The fiber optic drop terminal assembly of claim 14, wherein the second storage spool has a diameter that is substantially larger than a diameter of the first storage spool.

18. The fiber optic drop terminal assembly of claim 14, wherein a central passage extends axially through both the first and second storage spools, the central passage being configured to receive a mandrel about which the housing and the storage spools rotate in unison.

19. The fiber optic drop terminal assembly of claim 14, wherein each of the storage spools includes a core and first and second radial flanges that are axially spaced apart along the core.

* * * * *